United States Patent
Rachedi et al.

(10) Patent No.: US 11,265,966 B2
(45) Date of Patent: Mar. 1, 2022

(54) METHOD AND ASSEMBLY ALLOWING END-USER TERMINALS TO EXCHANGE OVER A WIRELESS MULTI-HOP COMMUNICATION PROXIMITY NETWORK WITH DYNAMIC ARCHITECTURE

(71) Applicants: Ecole Nationale Des Ponts Et Chaussees, Champ sur Marne (FR); Chambre de Commerce et D'Industrie de Region Paris lle de France, Noisy le Grand (FR); Centre National de la Recherche Scientifique (CNRS), Paris (FR); Universite Gustave Eiffel, Champs-sur-Marne (FR)

(72) Inventors: Abderrezak Rachedi, Brou sur Chantereine (FR); Hakim Badis, Meaux (FR)

(73) Assignees: Ecole Nationale Des Ponts Et Chaussees; Chambre de Commerce et D'Industrie de Region Paris Ile de France; Universite Gustave Eiffel; Centre National de la Recherche Scientifique (CNRS)

( * ) Notice: Subject to any disclaimer, the term of this patent is extended or adjusted under 35 U.S.C. 154(b) by 0 days.

(21) Appl. No.: 16/769,822

(22) PCT Filed: Dec. 4, 2018

(86) PCT No.: PCT/EP2018/083502
§ 371 (c)(1),
(2) Date: Jun. 4, 2020

(87) PCT Pub. No.: WO2019/110594
PCT Pub. Date: Jun. 13, 2019

(65) Prior Publication Data
US 2020/0374975 A1 Nov. 26, 2020

(30) Foreign Application Priority Data

Dec. 4, 2017 (FR) ..................... 1761613

(51) Int. Cl.
*H04W 84/18* (2009.01)
*G06F 16/901* (2019.01)
(Continued)

(52) U.S. Cl.
CPC ........ *H04W 84/18* (2013.01); *G06F 16/9024* (2019.01); *H04W 40/22* (2013.01);
(Continued)

(58) Field of Classification Search
CPC .. G06F 16/9024; G06F 16/901; H04W 40/22; H04W 40/24; H04W 64/003;
(Continued)

(56) References Cited

U.S. PATENT DOCUMENTS

| 7,522,628 B1* | 4/2009 | Elliott | H04Q 11/0062 370/328 |
| 2003/0072306 A1* | 4/2003 | Hunzinger | G01S 5/0289 370/389 |

(Continued)

FOREIGN PATENT DOCUMENTS

FR 3017017 A1 7/2015

OTHER PUBLICATIONS

Fabrice Theoleyre et al., Structure Virtuelle Pour Une Auto-Organisation Dans Les Réseaux Ad Hoc Et Hybrides, Annales Des Telecommunications—Annals Of Telecommunications, Get Lavoisier, Paris, FR, vol. 62, No. 1/2, Jan. 2007, pp. 240-268, XP001505051.
(Continued)

*Primary Examiner* — Nathan S Taylor
(74) *Attorney, Agent, or Firm* — Lerner, David, Littenberg, Krumholz & Mentlik, LLP

(57) ABSTRACT

The method concerns a method of communication between end-user terminals and user terminals that are static or have
(Continued)

low relative mobility with respect to each other, wherein a control server: —selects the terminals that are static or have low relative mobility from among the assembly of terminals, the other terminals being referred to as end terminals; —determines a graph, the nodes of which are static or low relative mobility terminals, —determines, on this graph of nodes, a sub-graph of dominant nodes; —selects, in the sub-graph of dominant nodes, at least one gateway node capable of establishing a communication with the Cloud Computing type network over their second cellular communication link; —selects the nodes of the graph which do not belong to the nodes of the sub-graph, as nodes having only the access/relay function to the dynamic multi-hop proximity network for the end-user terminals; —transmits its hierarchy status over the second cellular communication link, only individually to each of the various static or low relative mobility terminals.

16 Claims, 21 Drawing Sheets

(51) Int. Cl.
    *H04W 40/22*     (2009.01)
    *H04W 40/24*     (2009.01)
    *H04W 64/00*     (2009.01)
    *H04W 74/00*     (2009.01)

(52) U.S. Cl.
    CPC ......... *H04W 40/24* (2013.01); *H04W 64/003* (2013.01); *H04W 74/002* (2013.01)

(58) Field of Classification Search
    CPC ... H04W 74/002; H04W 84/18; H04W 64/00; H04W 74/00; H04W 16/18; H04W 40/20
    See application file for complete search history.

(56) References Cited

U.S. PATENT DOCUMENTS

| | | | | |
|---|---|---|---|---|
| 2005/0090201 | A1* | 4/2005 | Lengies | H04B 7/18506 455/41.2 |
| 2005/0176401 | A1* | 8/2005 | Nanda | H04W 52/46 455/403 |
| 2007/0104215 | A1* | 5/2007 | Wang | H04L 47/762 370/458 |
| 2014/0029448 | A1* | 1/2014 | Balachandran | H04J 11/0053 370/252 |
| 2014/0071884 | A1* | 3/2014 | Sherman | H04J 11/0056 370/315 |
| 2014/0220923 | A1* | 8/2014 | Shoshan | H04W 16/32 455/404.1 |
| 2015/0010153 | A1* | 1/2015 | Robertson | H04K 3/226 380/270 |
| 2017/0041852 | A1* | 2/2017 | Gruet | H04W 52/0261 |
| 2017/0311249 | A1* | 10/2017 | Lopes | H04W 36/30 |
| 2017/0353978 | A1* | 12/2017 | Ulinskas | H04W 76/10 |
| 2019/0364492 | A1* | 11/2019 | Azizi | H04W 48/16 |

OTHER PUBLICATIONS

International Search Report for Application No. PCT/EP2018/083502, dated Jan. 23, 2019, pp. 1-3.
French Preliminary Search Report for Application No. 1761613 dated Jul. 25, 2018, 2 pages.

* cited by examiner

METHOD AND ASSEMBLY ALLOWING END-USER TERMINALS TO EXCHANGE OVER A WIRELESS MULTI-HOP COMMUNICATION PROXIMITY NETWORK WITH DYNAMIC ARCHITECTURE

CROSS-REFERENCE TO RELATED APPLICATIONS

The present application is a national phase entry under 35 U.S.C § 371 of International Application No. PCT/EP2018/083502 filed Dec. 4, 2018, which claims priority from French Application No. 1761613 filed Dec. 4, 2017, all of which are hereby incorporated herein by reference.

The present invention relates to a process and an assembly allowing end-user terminals to exchange over a wireless multi-hop communication proximity network with dynamic architecture the nodes of which are static user terminals or low relative mobility terminals.

They apply advantageously for exchanges in terms of collaborative services, for example, but not limiting, in the road sector (navigation aid, traffic info, etc.).

PRIOR ART AND GENERAL TECHNICAL FIELD

Conventionally, applications of real time type such as for example collaboratives by way of illustration but non-limiting are hosted in remote resources (the "Cloud" (English terminology used hereinbelow)—dedicated or public). This offers fluid and seamless access to external computing resources (storage capacity, processing power, etc.).

These applications of real time type demand a limited response time to avoid delays in receiving and displaying data (position, speed, etc.) in real time. This response time comprises two parts: time for the Cloud to receive and process the information and time for the datum to travel the network between the user and the Cloud, and this return travel.

Whereas there are means for optimising processing time in the Cloud, the return time itself remains uncontrollable as it depends on several parameters: the distance between the Cloud and the end-user, the risk of data congestion in transport networks, coverage and quality of radio access networks whether cellular (3G/3G+/4G/5G) or WiFi (IEEE 802.11n/ac/p) to which the user is connected.

The invention proposes a process and a communications system which are part of a strategy for reducing the return time for access to collaborative services, and of a strategy for cost reduction of architecture for the network.

It is also clear that current solutions require users to have access to Cloud services and have an internet connection, especially via WiFi, 3G/4G/5G networks, etc. Such a connection may however not be available, especially if the user is outside radio coverage zones or in a zone with no new availability, for example when the nearby access terminal has reached its maximal number of connections.

Likewise, the user can be deprived of access to the service due to a poor-quality radio link caused by interference, or even when his cellular communication package has run out.

And the cost associated with data usage travelling over profitable access networks can also be a hindrance.

GENERAL PRESENTATION OF THE INVENTION

An aim of the invention is to bring the end-user close to the information and utilise local resources ("Fog" according to English terminology used hereinbelow) in addition to remote resources ("Cloud Computing") to reduce the return time and absorb delays in receiving data.

Another aim of the invention is to allow clients to interact with the proposed application or existing applications by soliciting traditional access networks (3G/3G+/4G/5G) as little as possible.

Yet another aim of the invention is to rely on a collaborative and participative community of users (drivers, pedestrians, cyclists, traders, local community, . . . ) to enrich the database, refine calculations, and respond to social character.

In particular, according to an aspect the invention proposes a process for communication between terminals suitable for carrying out wireless proximity communications between them when they are at distances allowing this, as well as communicating individually with remote resources.

In this process, terminals are used which are static or low relative mobility so that they jointly form the nodes of a local communication network with dynamic architecture. The different terminals located at a distance and setting up wireless proximity communication with at least one of the static user terminals or low relative mobility terminals can exchange between each other over this network.

In this way, the invention more particularly proposes a process for communication between end-user terminals and static user terminals or low relative mobility terminals relative to each other, these terminals being adapted to carry out between them, via a first communication link which is a wireless communication link, wireless proximity communications when they are at distances allowing this, as well as communicating individually, via a second communication link which is a cellular communication link, with at least one server of remote resources which is a control server accessible over a network of "Cloud Computing" type.

In this process,
  the static user terminals or low relative mobility terminals jointly form the nodes of a multi-hop proximity communication network with dynamic architecture and exchange between them in this network via their first wireless communication link,
  these static user terminals or low relative mobility terminals of the multi-hop proximity network exchanging with at least the control server which supervises the architecture of said multi-hop proximity network,
  and the other user terminals being the end-user terminals and communicating with at least one of the static user terminals or low relative mobility terminals of the network via the first wireless communication link.
  This process which comprises the following steps:
  each terminal transmits via the second cellular communication link to the control server(s) control information such as identification and positioning information, as well as information relative to at least one technical parameter,
  as a function of control information received, the control server:
    selects the static terminals or low relative mobility terminals from all terminals, the other terminals being so-called end terminals,
    determines a graph whereof the nodes are the static terminals or low relative mobility terminals, two nodes being connected by a bridge if the distance between them is less than the distance allowing them to exchange directly between them via the dynamic multi-hop proximity network, determines on this graph of nodes a sub-graph of dominant nodes, the determining of this sub-graph being optimised to minimise the number of nodes and respect a given constraint on at least one given technical parameter, selects in the sub-graph of dominant nodes at least one gateway node suitable for setting up communication with the network of Cloud Computing type via their second cellular communication link, selects the nodes of the graph not belonging to the nodes of the sub-graph as nodes having the sole function of access/relay to the dynamic multi-hop proximity network for end-user terminals, transmits via the second cellular communication link solely individually to each of the different static terminals or low relative mobility terminals its hierarchical status of: gateway node, dominant node or simple access/relay node attributed to them to constitute the dynamic multi-hop proximity communication network over a period as a function of the ongoing configuration of the static terminals or low relative mobility terminals.

Advantageously, once the dynamic multi-hop proximity communication network is complete, when an end-user terminal or a static user terminal or low relative mobility terminal emits a request, this terminal transmits:

in the first instance via its first wireless communication link to the multi-hop proximity communication network, the dominant nodes being suitable for managing said request to respond to the terminal interrogating them, in the second instance, without satisfactory response from the dominant nodes, to the control server, either directly via its second cellular communication link, or by means of another terminal which is a gateway node, communicating with the control server via the second cellular communication link of this other terminal.

The control server can subdivide the graph into several geographic zones of interest for which one or more technical parameters is defined, and calculates the dynamic communication multi-hop proximity network which has static terminals or low relative mobility terminals in these geographic zones of interest.

The control server can execute its processing on several technical parameters and defines an order of priority of these technical parameters. In particular, the control server can define an order of priority in each geographic zone of interest.

The technical parameter or the technical parameters transmitted by a terminal to the control server can be selected from the following list:

degree of connectivity with the other terminals (number of direct adjacent nodes);

radio coverage (radio range);

connection quality; (1) The connection quality between the terminals and the operator network and 2) The connection quality between the terminals and the proximity network);

memory capacity for data storage;

available battery power level;

speed of the terminal (speed of the terminal relative to the ground ("conventional" speed) and relative speed relative to adjacent terminals);

quality of the connection of the terminal to the dynamic multi-hop proximity network;

e-reputation or other information of the owner of the terminal characteristic of social networks.

Likewise, the technical constraint can be defined by:

a threshold, especially when the technical parameter is the radio coverage; or two to four classes of intervals for a technical parameter, especially when the technical parameter is the memory capacity for data storage or the available battery power level.

In particular, the technical constraint can be defined for a radio coverage threshold in a zone of interest. Especially then:

two technical parameters are used: the degree of connectivity and the radio coverage which has an order of priority below that of the degree of connectivity;

the overlap of the radio coverage of the nodes with the geographic zone or the geographic zones of interest is calculated, the nodes having the most radio coverage in the geographic zone or geographic zones of interest as dominant nodes are retained, and the surface of the zones of interest ZI to be covered outside radio coverages of the determined dominant nodes is reinitialised to find other additional dominant nodes if necessary to cover the zone of interest ZI; a geographic zone of interest (ZI) is a zone defined by the application and which can take several forms (circle, square, polygon, etc.) with a fixed or different size (the size can be expressed as a function of the radio range).

Data can be hosted in the dominant nodes of the dynamic multi-hop proximity communication network, and originate from the network of Cloud Computing type, the control server and/or the terminals, the dominant nodes being capable of communicating and sharing data between them.

The outside range of communications for the first wireless communication link is for example under 300 metres, and for the second cellular communication link over 400 metres.

The terminals are for example configured with WiFi and/or Bluetooth and/or Zigbee and/or V2X and/or C-V2X communication interfaces, DSRC for their first wireless link, and with 2G and/or 3G and/or 4G and/or LTE and/or 5G communication interfaces for their second cellular communication link, the control server complying with the SDN model, each terminal having a corresponding control unit.

When the control server detects the arrival and/or the departure of static terminals or low relative mobility terminals, it can recommence determining statuses of network nodes constituted by static terminals or low relative mobility terminals.

To determine the sub-graph comprising a geographic zone or geographic zones of interests (ZI), the control server can perform the successive 4 steps:

in a first step, of forming a Maximum Independent Set (MIS) in the graph, and independently in the geographic zone or geographic zones of interests of the sub-graph if the graph comprises one or more geographic zones of interests;

in a second step, of forming a Minimum Dominating Set (mDS) by:

(i) calculating the scores of the technical parameter or technical parameters for each node of the graph to obtain first dominant nodes, these scores satisfying the constraint on the technical parameter or parameters for the dominant nodes, (the score is a value of a technical parameter in a given metric. In particular, in the case of several technical parameters, this metric is a mixed metric, the value (called score) being a function of the values of the different technical parameters; for this purpose these values must undergo transformation to be shown in the same field (for example in the interval [0-1]).

Also, these technical parameters do not have the same degree of importance/priority. As a consequence, each technical parameter has a weighting coefficient which expresses this importance or difference relative to the others); once these black nodes are fixed their score is no longer important and other black nodes are then determined with calculating of the score of the latter.

(ii) updating the scores of the technical parameter or technical parameters;

(iii) determining other second dominant nodes in addition to the first dominant nodes by recommencing phase (i) and phase (ii) until the constraint is not satisfied for the remaining nodes;

in a third step, updating remaining nodes in dominated nodes on the entire graph for which all zones of interest have been combined; and updating scores of the technical parameter or technical parameters and determining of other dominant nodes from dominated nodes;

in a fourth step, interconnecting the dominant nodes between them to form a Minimum Connected Dominating Set (mCDS).

In the first step the control server can previously eliminate the nodes which do not respect the preferred class of interval for the given technical constraint on the given technical parameter, the classes of interval being determined by calculating a score of the technical parameter.

Especially, the control server transforms dominated nodes into dominant nodes in the third phase after combining of all zones of interest to form the entire graph.

In a possible execution of the process proposed especially:

a first technical parameter can be a priority relative to at least one second technical parameter;

and:

in the second step, the status of dominant node is attributed to the node whereof the score respects the preferred class of interval (or a given threshold) for the first technical parameter, and in case of equality with one or more nodes whereof the score respects the preferred class of interval (or the threshold), the node which respects the preferred class of interval for a second technical parameter (or whichever has the higher score), and in case of new equality with one or more nodes whereof the score respects the preferred class of interval of the second technical parameter, the node which also respects the preferred class of interval for a third technical parameter which would be a lesser priority than the second technical parameter, or one of these nodes if there is no third technical parameter, and then in the second step, the status of intermediate nodes is attributed to the adjacent ones of the node qualified as dominant node and which are not dominant nodes.

The process applies especially in the event where the terminals are vehicles integrating equipment of communication systems which can be embedded or not embedded, portable telephones, computers.

Low relative mobility terminals can for example mean terminals which have speeds between them less than or equal to a speed of pedestrian/remain in the zone of interest/ and always stay connected via the dynamic multi-hop proximity network with the same static terminals or adjacent low relative mobility terminals of the Fog, such as stationary vehicles.

The invention also relates to an assembly comprising end-user terminals and static user terminals or low relative mobility terminals, these terminals being adapted to execute between them wireless proximity communications when they are at distances allowing them to communicate individually via a first wireless communication link with remote resources via a second cellular communication link, in the static user terminals or low relative mobility terminals jointly form the nodes of a multi-hop proximity communication network with dynamic architecture, the other terminals known as end-user terminals communicating with at least one of the static user terminals or low relative mobility terminals of the network via a first wireless communication link, the assembly also comprising at least one remote control server of the architecture of said network, which is itself connected to a network of Cloud Computing type, and with which the static user terminals or low relative mobility terminals of the multi-hop proximity network exchange, the end-user terminals communicate to the control server solely their control information via a second cellular communication link, and communicate to the dynamic multi-hop proximity communication network solely via their first wireless communication link, the static user terminals or low relative mobility terminals being functionalised as follows:

static terminals or low relative mobility terminals known as dominant nodes respond to requests from end-user terminals and host data originating from the network of Cloud Computing type, control server and/or terminals, some only of these static terminals or low relative mobility terminals being dominant gateway nodes which communicate, via the first wireless communication link and/or the second cellular communication link, to the control server;

static terminals or low relative mobility terminals known as access/relay nodes to the multi-hop proximity network.

The terminals are for example vehicles, portable telephones, computers. Static terminals or low relative mobility terminals are stationary vehicles.

PRESENTATION OF FIGURES

FIGS. 1a and 1b illustrate the general architecture of a communication system complying with a possible embodiment FIGS. 2a and 2b illustrate the notions of CDS and MIS;

FIGS. 3a à 3c illustrate phase 1 of an example embodiment of an algorithm in line with the invention (calculation of the MIS);

Figure 8B:
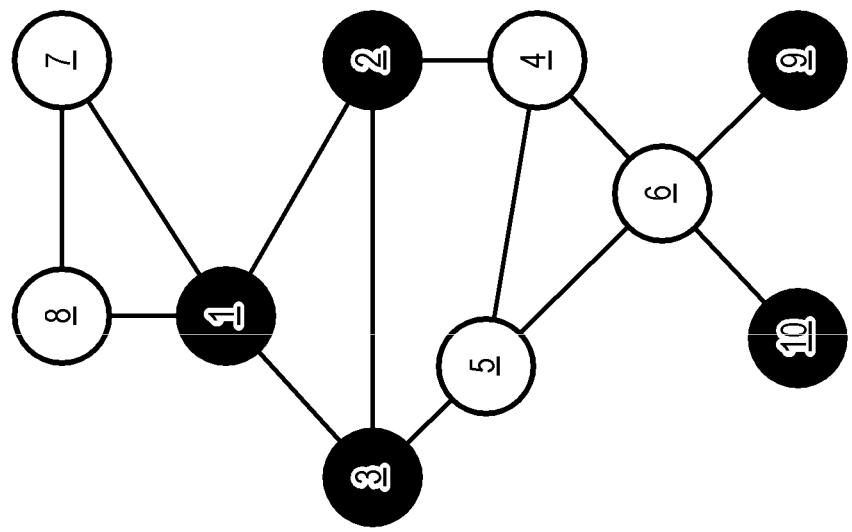
Figure 8A:
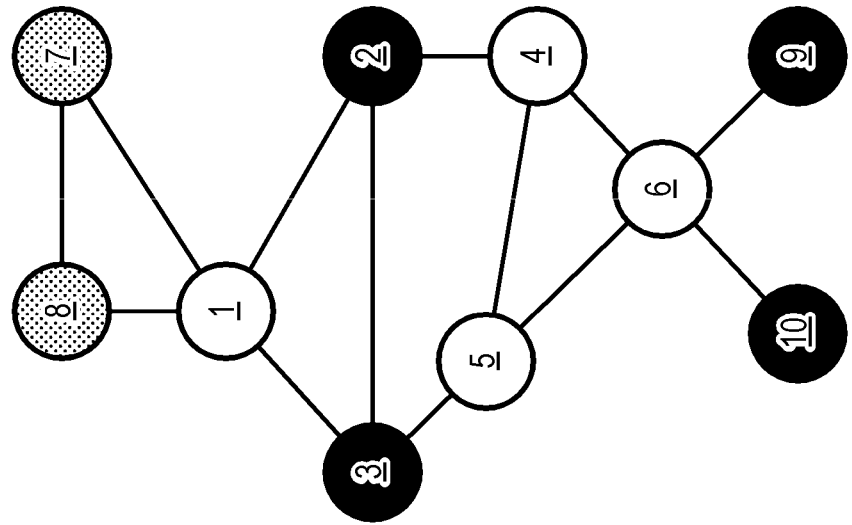
Figure 9B:
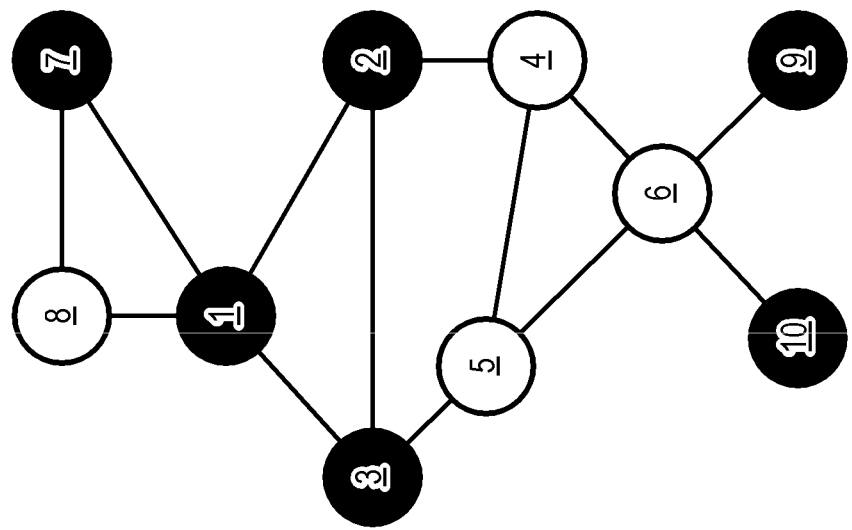
Figure 9A:
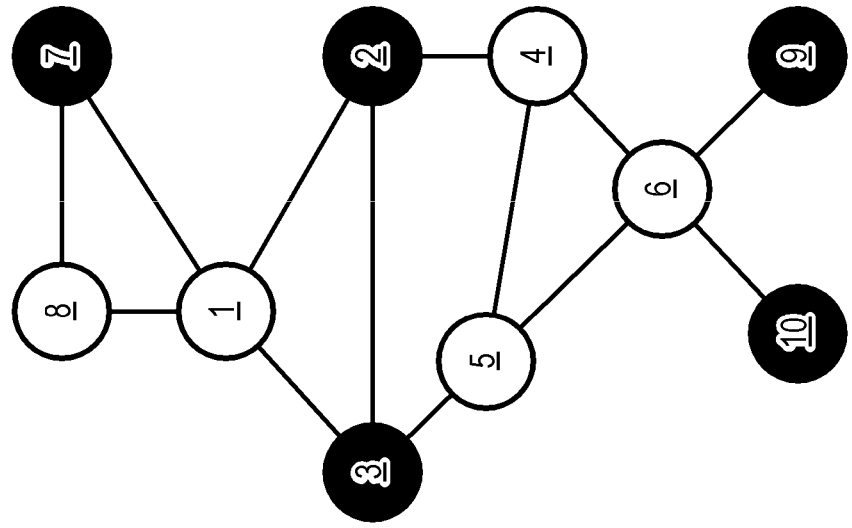
Figure 10B:
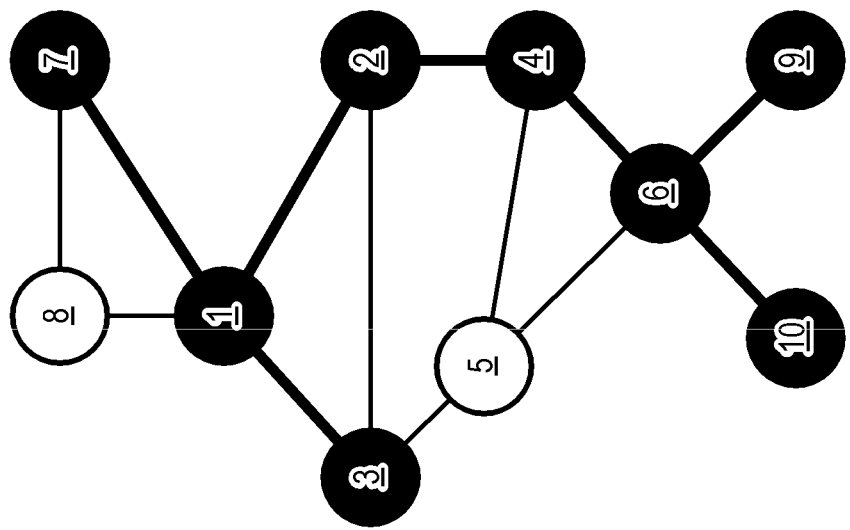
Figure 10A:
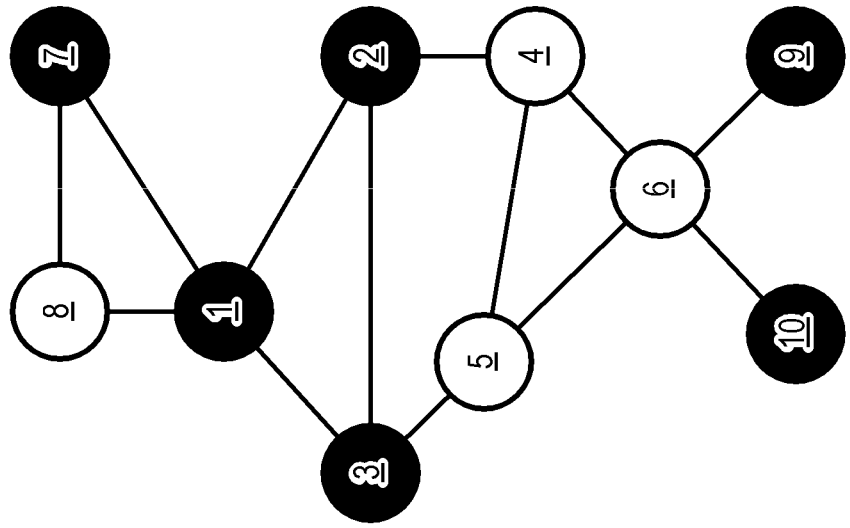
Figure 14A:
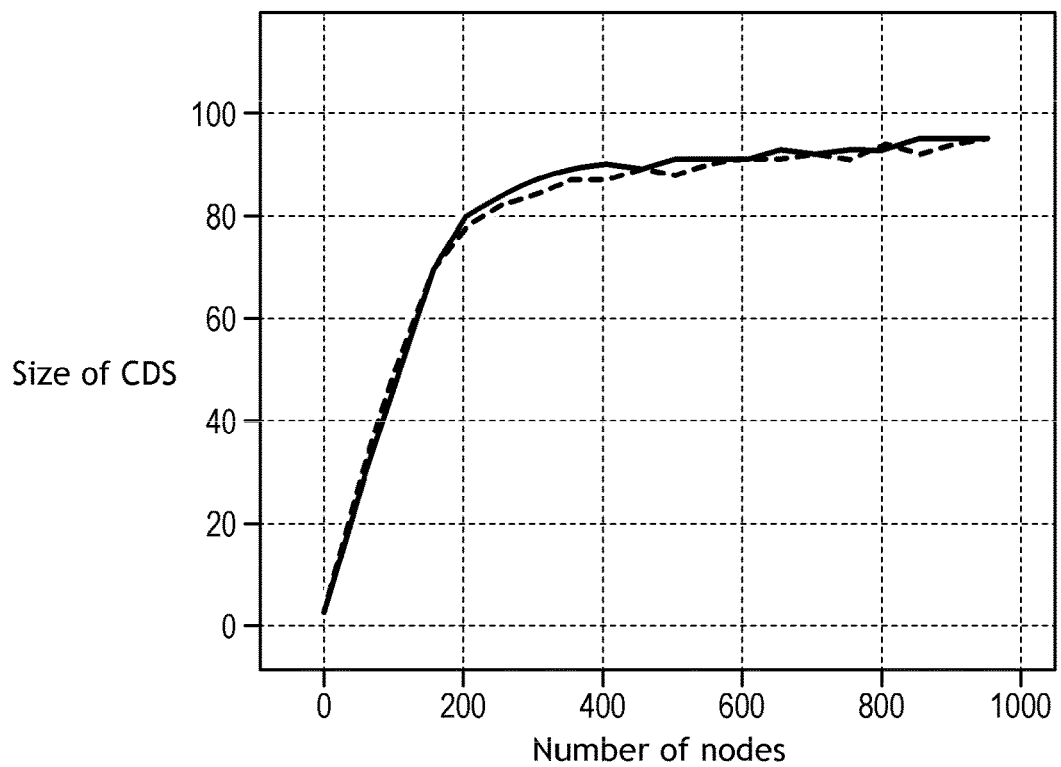
Figure 14B:
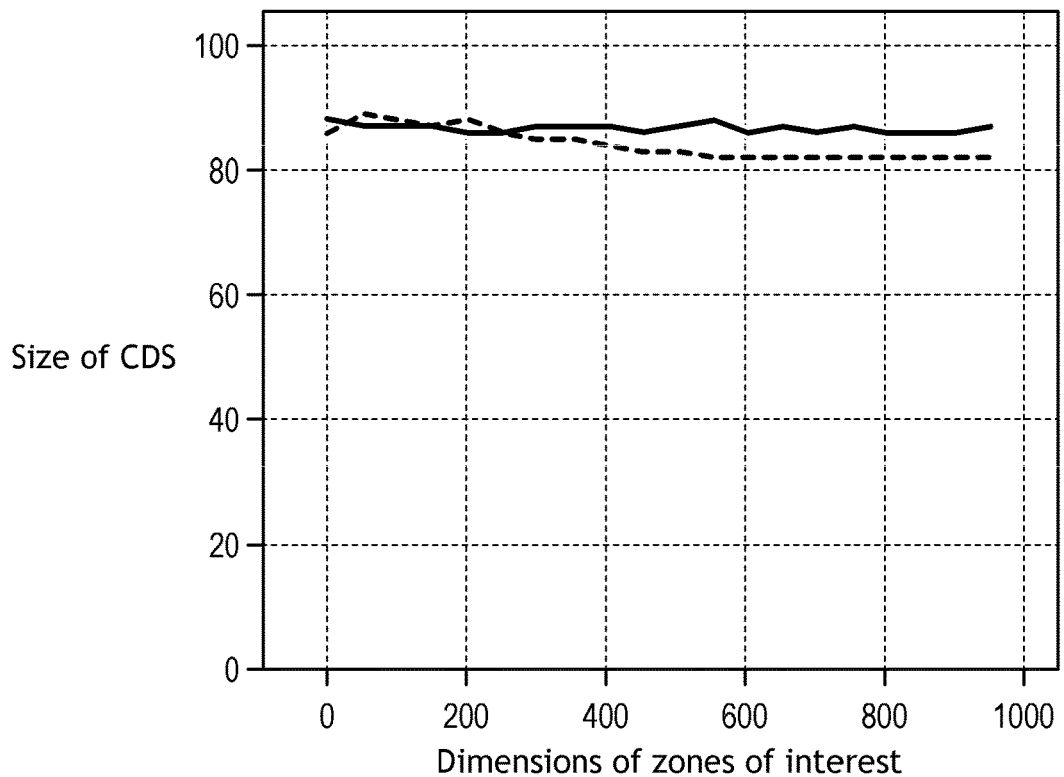
Figure 14C:
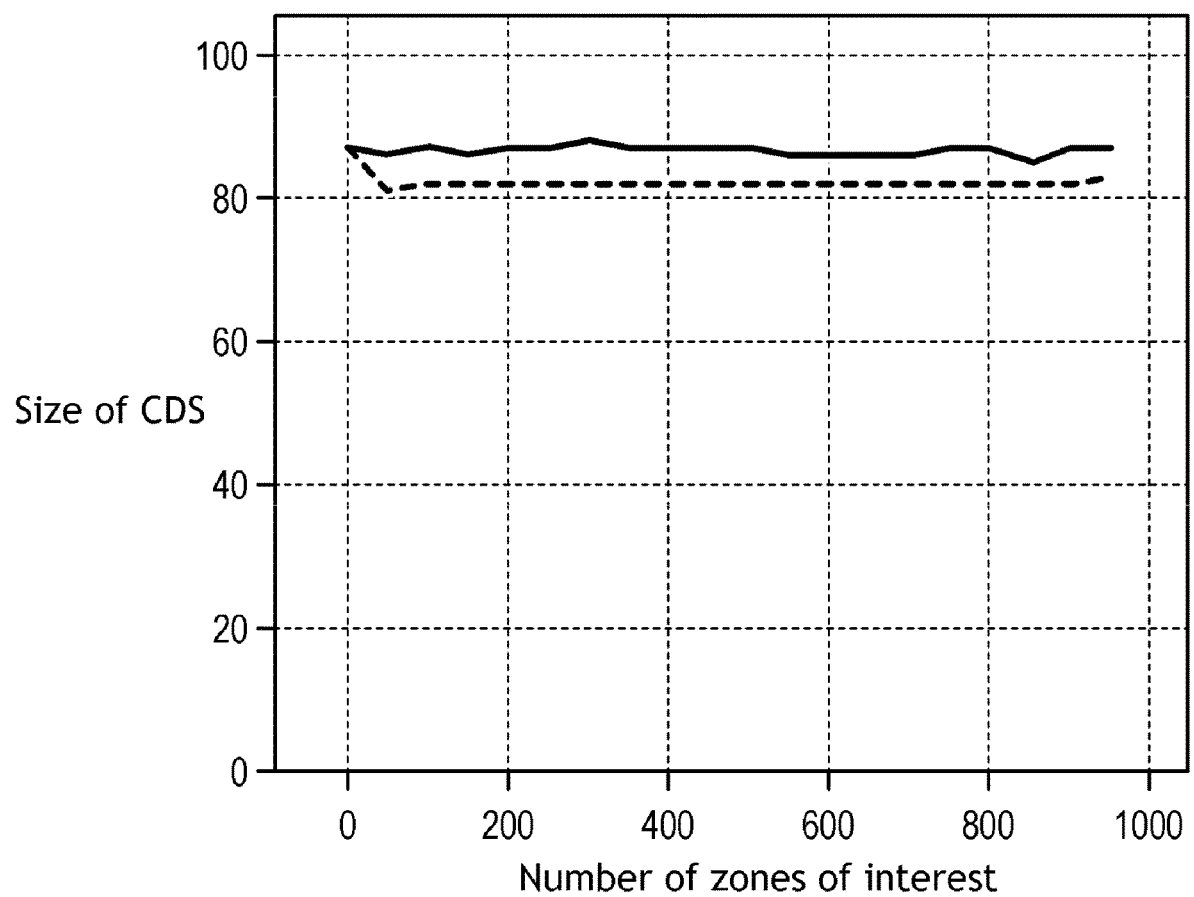

FIGS. 6a, 6b and 7a to 7c illustrate phases 3a and 3b of the same algorithm;

FIGS. 8a, 8b illustrate another variant embodiment of these steps;

FIGS. 9a, 9b and 10a, 10b illustrate the fourth phase of the same algorithm;

FIGS. 11 to 13a-13g illustrate another embodiment with the same algorithm;

FIGS. 14a, 14b and 14c give results of dimensions of networks Fog obtained as a function of the number of nodes departure (FIG. 14a), as a function of the dimensions of zones of interest to be covered (FIG. 14b) or even as a function of the number of zones of interest to be covered (FIG. 14c).

DESCRIPTION OF ONE OR MORE EMBODIMENTS OF THE INVENTION

General Architecture

Figure 1A:
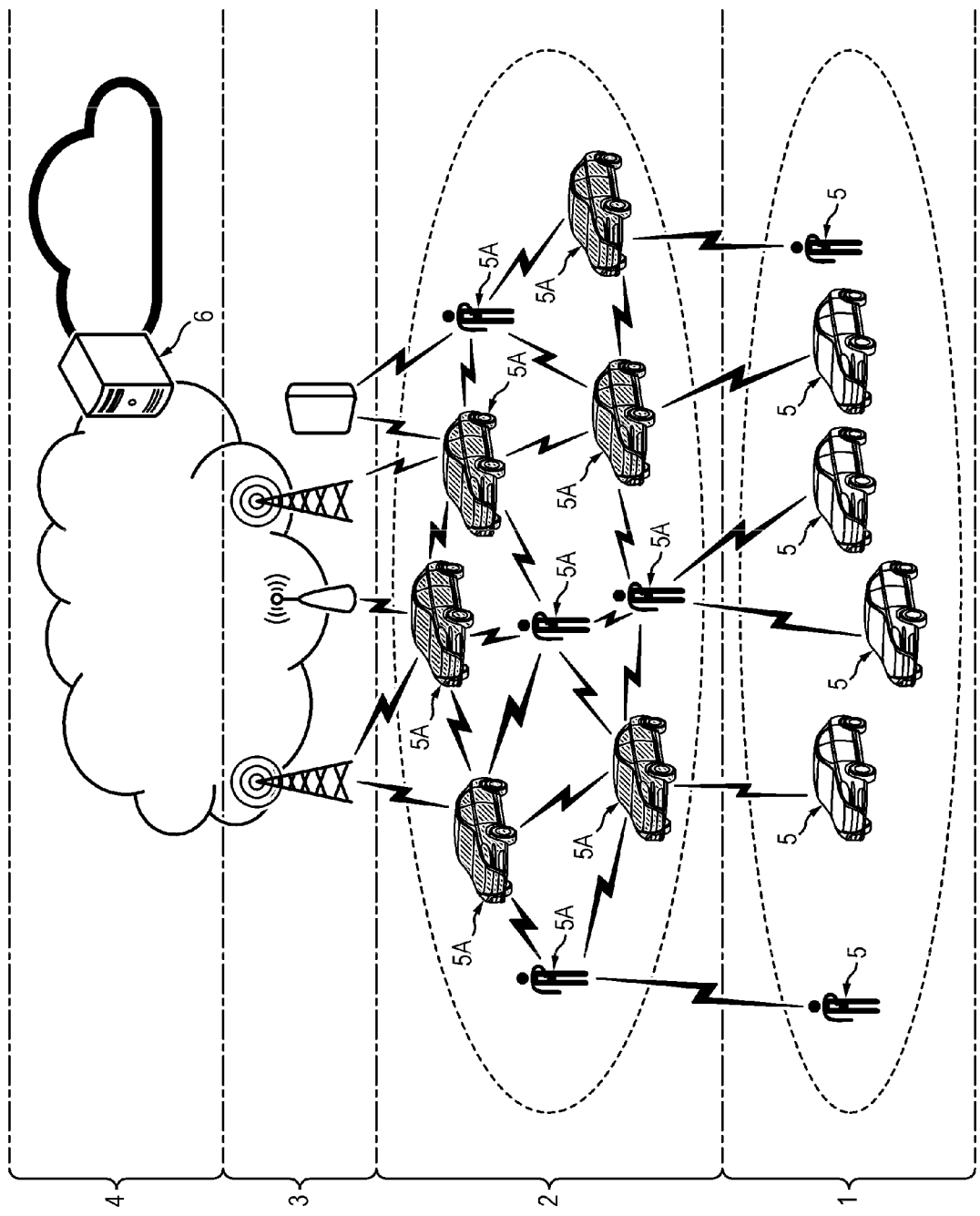

FIG. 1a shows the general architecture of a communication system in line with a possible embodiment.

This general architecture comprises four independent layers:
- a so-called "end-user" layer 1,
- a layer 2 forming the nodes of the multi-hop virtual proximity network with dynamic architecture,
- an access layer 3 comprising classic means of a communication network, for example such as a cellular network or a WiFi network,
- a Cloud layer 4 containing a controller 6.

"End-User" Layer

The "end-user" layer 1 is constituted by terminals comprising communication means 5 (portable telephones, computers, dashboards connected of a vehicle or any other adapted communication means).

These communication terminals 5 comprise especially three interfaces:
- one for communication of terminals with each other when they are close (range of under or equal to 500 metres) (for example a WiFi interface (IEEE 802.11n/ac/p) and/or Bluetooth and/or Zigbee and/or V2X and/or C-V2X and/or DSRC, etc. . . . ) interface,
- another for communication with remote resources (cellular interface (3G/3G+/4G/LTE/5G) for example),
- a geolocation interface (positioning via satellite for example).

From these terminals 5 users have previously downloaded the application corresponding to the shared service information they want to access.

This application is an application for navigation and community traffic info, for example.

Other types of services utilising access to shared data are also possible. In particular, in addition to or independently of the navigation and traffic info application the service can provide music-sharing services, and more generally sharing of various data: information on available parking spaces, promotions in given shops, IoT (Internet of Things) data, etc . . . .

By installing the application and after a registration phase, the user becomes a member of the community. He can then benefit from primitive services of the application, specifically for example the navigation and status of traffic. Other services can be progressively made accessible to the user according to his contribution in the infrastructure network and in the community.

Virtual Multi-Hop Proximity Network with Dynamic Architecture

The application downloaded from the terminals 5 determines on the latter, by interrogating the location interface, whether they are moving or on the contrary are static or in a situation of relative low mobility.

These static terminals or low relative mobility terminals (stationary vehicles for example)—referenced by 5A in FIG. 1a—are used to constitute the virtual network and form a temporary and opportunistic network infrastructure.

When it is activated by the application and the latter detects whether this concerns a static or low relative mobility terminal, such a terminal 5A detects in the first instance, in the community, its adjacent terminals which are also static or low relative mobility by using the "Bonjour" protocol on the WiFi interface.

It then sends a message to the controller 6 of the layer 4, via the cellular or WiFi interface, indicating its geolocation position, as well as different technical parameters, for example: quality of WiFi and cellular connection, memory capacity for data storage, list of its adjacent terminals, degree of connectivity with the other terminals, available battery power level, speed of the terminal, quality of the connection of the terminal to the dynamic multi-hop proximity network (when the latter is created), e-reputation or other information on the owner of the terminal characteristic of social networks, etc. . . . .

When it receives messages from all low relative mobility users the controller 6 constructs a mesh topology of users.

The nodes of this mesh are mobile terminals 5A.

Two nodes 5A are connected by a bridge if the distance between them is less than the radius of coverage letting them exchange directly between them.

On this topology the controller 6 executes the algorithm which will be described hereinbelow to determine the role of each user.

Figure 1B:
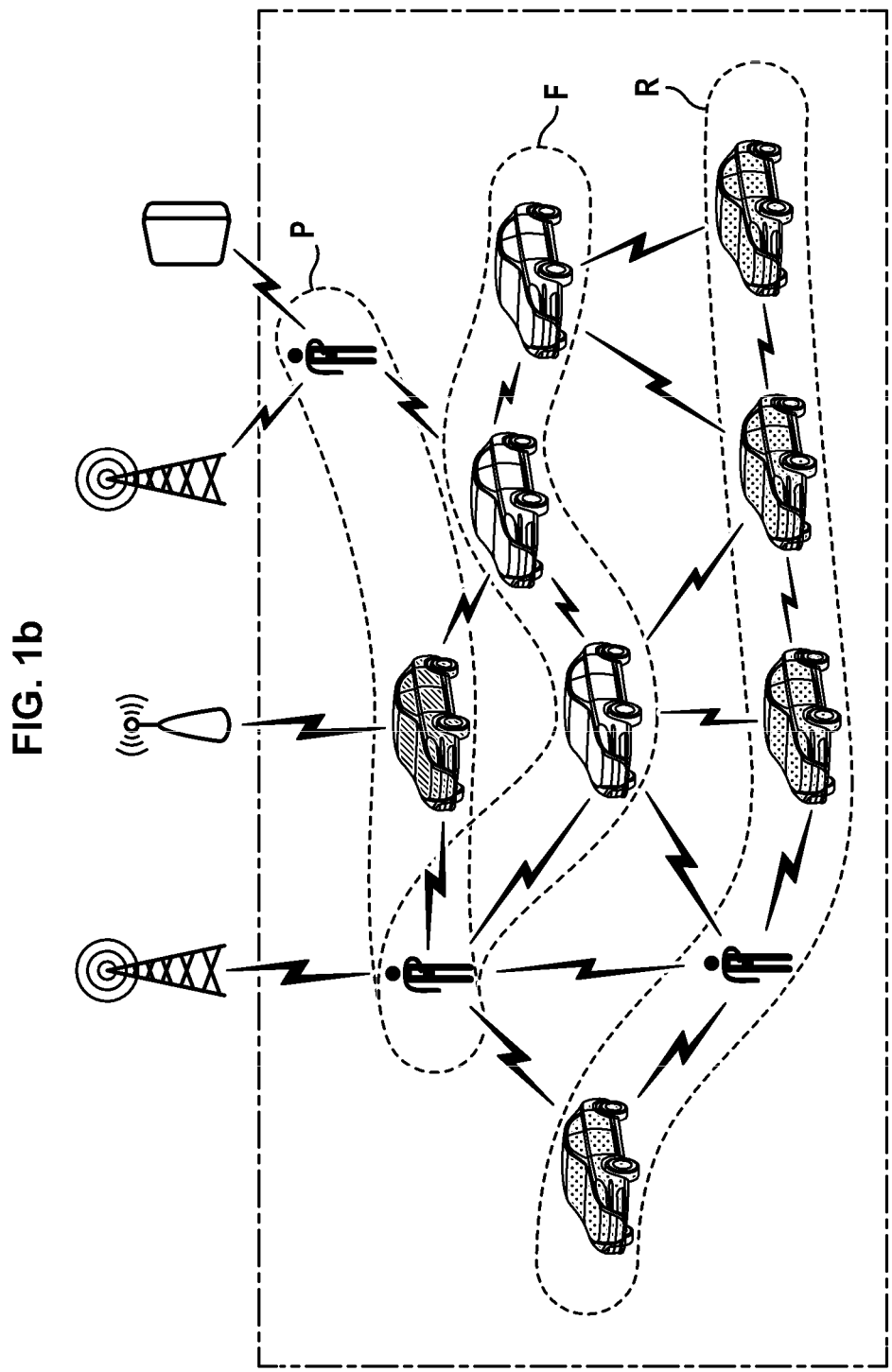
Figure 3C:
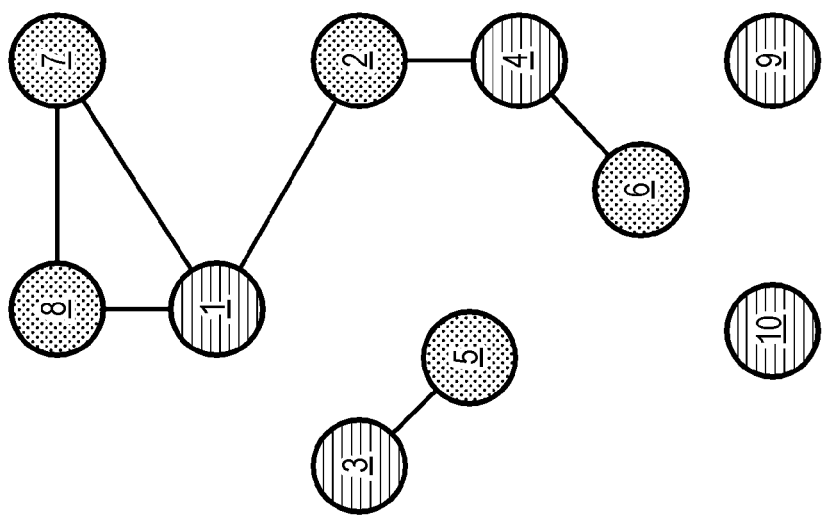

Therefore, of the terminals 5A:
- some (referenced by R in FIG. 1b) will play the role of relay and form the WiFi access network to the Fog,
- others (referenced by F in FIG. 1b) will play the role of node of the local resources network (Fog network),
- others still will play the role of gateway ("gateway" P in FIG. 1b) ensuring connection of the Fog to traditional access networks (cellular, public WiFi terminal, Box of a user, . . . ) to reach the Cloud. FIG. 3 shows an example of such a selection.

The nodes F of the Fog network are selected intelligently in minimal but sufficient number to reduce WiFi interference between nodes of the network, offer the best connection in terms of flow to relay users, offer considerable storage volume, ensure tolerance to breakdowns and mobility.

It should be noted that this problem is a problem of NP-Complete combinatory optimisation. The algorithm finds quasi-optimal solutions in an acceptable quasi-linear calculation time.

To reach this aim the algorithm models the problem in the form of the search for a related optimal dominant assembly.

The dominant nodes represent the nodes of the Fog, but at the same time they can also be relays R and/or gateways P.

The dominated nodes represent the relays R and/or gateways P.

Another highly important element in the algorithm is that it also monitors the presence (when this is possible) of nodes of the Fog near centres of interest, whether these are permanent such as intersections, traffic lights, road crossings, etc., or temporary such as concert halls, reception sites for sports events, . . . .

This lets users access and quickly pull up information in sensitive and high-density zones without congesting the rest of the Fog.

The gateway users P per se ensure the link between the nodes F of the Fog network and the Cloud. In fact, when the Fog network does not have the data claimed by the clients, it interrogates the Cloud via users having a good Internet connection over classic networks (3G/3G+/4G/5G, WiFi, etc. . . . ).

The users P responsible for this intermediary mission between the Fog and the Cloud are designated by the algorithm as a function of the quality of their Internet links. Only the best links are selected.

Layer 3—Classic Communication Means

The layer 3 is constituted by the classic elements of wireless technologies of Internet access (cellular or WIFI technology).

A user can connect via 3G/3G+/4G/5G cellular networks or via a WiFi connection behind a public, private or community terminal. Given that WiFi suffers from mobility problems, the low relative mobility of users of the virtual network, including gateways, favours WiFi connections.

Layer 4—Cloud and Controller 6

The controller 6 is the hub of the architecture. It acts as coordinator of the various user equipment and allows programming of network operations.

For this purpose, the controller 6 hosts a server with the capacity of personalising the different parameters of the sub-assembly of terminals forming the backbone of the virtual such as defined by the formation algorithm, then selecting the relayed nodes. It is accessible via a network in cloud computing (or "Cloud Computing" in the present text). The aggregation of data and the storage process forms part of the computer cloud allowing for distribution of some of these services over the nodes F of the virtual Fog network.

These operations are brought into service via SDN technology (software networking-) which configures the equipment of users transparently on the fly.

During installation of the application, authorisations are requested by the server 6 from clients, who at any time can redefine their degrees of collaboration.

The SDN controller 6 of the Cloud layer 4 ensures formation and maintenance of the virtual network layer.

The choice of the SDN technology in its capacity to provide an abstraction network layer and accelerate its deployment.

User equipment is simply implementing data-processing rules injected by the controller.

On the user side equipment therefore does not need routing protocols to be implemented.

Users also need the application to be deployed in the Cloud which serves as global reference and offers availability of data in case of absence in the Fog.

Example of Execution

Surveying by the SDN Controller of Low Relative Mobility or Static Users and their Parameters Each user of the community which is static at low relative mobility periodically sends to the SDN controller (via its internet connection) its identifier, its GPS position, and several technical parameters such as speed, degree of connectivity with other terminals, radio coverage, quality of connection of the terminal to the dynamic multi-hop proximity network (quality of WiFi connection for example), its quality of cellular connection (3G/4G/5G, etc.), its storage capacity, its available battery power level, or even the e-reputation or other information of the owner of the terminal characteristic of social networks.

Construction of a Virtual Network by the SDN Controller

As a function of information sent by users of the community, the SDN controller first builds a connection graph where each node represents a user and there is a bridge between two users if the distance between them is less than the radius of the WiFi coverage.

Based on the resulting graph the control server (controller 6) executes the algorithm described hereinbelow to determine an optimal sub-assembly of dominant nodes and connected between them to form the core network (FoG) ("Virtual Backbone" or nodes forming the backbone of the network—corresponds to "black" nodes below).

The rest of the nodes form the access (relay) network (corresponds to the "white" nodes below).

One or more of these nodes (dominant or dominated is also selected as gateways to ensure connectivity with the Cloud.

Informing the Configuration of Each User

After having determined the role of each user, the SDN controller informs each user of its role (relay F and/or node of Fog F and/or gateway P and its configuration (IP address, frequency used, . . . )

An SDN manager installed on terminals 5 of users executes the configuration.

Management of Data Storage in the Fog

Data hosted in the nodes F of Fog can originate both from the Cloud and end-users.

In the first case, the Cloud explicitly shares with the Fog data relative to the geolocation of the latter. In other terms the Cloud will be distributed over several Fogs. Quite clearly, this operation is conditioned by the capacity for storage of Fogs.

In the second case, the most frequently requested requests and client alerts are also stored in the Fog.

In the first case, as in the second, a distributed hash table (DHT) is used to geolocate the nodes of the Fog having the data.

Maintenance of the Network Fog

For detecting changes in topology (graph), the terminals must periodically send their positions and their parameters to the controller 6 (see list already given above by way of example).

When the SDN controller 6 detects the arrival and/or the departure of low relative mobility terminals, it restarts reconstruction of the Fog.

Examples of Proposed Services

As already pointed out, shared services and information which users can access can be of different types:
Navigation aid/geolocation in real time,
Traffic Info/road safety (alerting of incidents on roads and the presence of risk zones or even the presence of radar or police on the roadside, etc. . . . ),
Exchanges of multimedia contents,
Downloading new mobile applications,
Sharing all data types (music, available parking spaces, in-store promotions, IoT, . . . )
Etc. . . . .

Construction Algorithm of the Virtual Network—Generalities

It is noted that construction algorithms of ad hoc networks the size of which could be minimised are already known, especially those by
Cheng et al, 2004, CHENG, Xiuzhen, DING, Min, and CHEN, Dechang. An approximation algorithm for connected dominating set in ad hoc networks. In Proc. of International Workshop on Theoretical Aspects of Wireless Ad Hoc, Sensor, and Peer-to-Peer Networks (TAWN). 2004.
(Theoleyre and Valois, 2006) THEOLEYRE, Fabrice and VALOIS, Fabrice. Auto-organisation of ad hoc networks: concepts and impacts. 2006.
algorithms for building ad hoc networks whose size is intended to be minimized.

Yet these algorithms do not at all take into consideration mobility or other technical parameters such as flow, battery, coverage of a zone of interest, storage capacity, e-reputation, etc. They could hardly be used in the case of networks of terminals and in the applications of the type of those envisaged to the extent where each terminal itself executes the algorithm, substantially reducing flow and battery.

The advantage of the selection algorithm of nodes of the virtual network which is described hereinbelow is that it can take into account the zones of interest.

It selects the dominant nodes which will serve as nodes for the virtual network on the basis of an objective function under several constraints on the technical parameters defined by the application.

The objective function is the minimisation of the number of nodes.

An obligatory constraint is constituted by the fact of forming a CDS, that is, a connected sub-assembly of apices of graphs constituted by dominant nodes such that all the other nodes have at least one dominant adjacent node.

Additional constraints on the technical parameters of the algorithm can be considered according to applications. They can be for example the following:
  the selected nodes must cover a minimum threshold of the surface of the zones of interests;
  the selected nodes must have a minimum threshold of battery level;
  the selected nodes must have a minimum threshold of storage capacity;
  the selected nodes must have a minimum threshold of flow;
  and more generally all have to be optimised by the group of selected nodes and relative to one or more technical parameters of the terminals (typically scores can be calculated on these parameters and compared to thresholds.

The score is a value of a mixed metric which combines one or more technical parameters; so as to mix the technical parameters in a single value (called score) they must undergo transformation to be represented in the same field (for example in the interval 0-1). Also, these technical parameters do not have the same degree of importance/priority. As a consequence, each technical parameter has a coefficient which expresses this importance or difference relative to the others). The score is the value of the technical parameter or technical parameters which evolves during execution of the algorithm. It is utilised in determining the dominant nodes known as black; once these black nodes are fixed their score is no longer important; the next step is determining other black nodes with calculation of the score of the latter.

For use of several technical parameters, an order of priority is defined between them. The nodes are selected to optimise the highest-priority parameter and to satisfy the constraints on the other parameters. In the event where several candidate nodes have the same values of a technical parameter, selection will be made by the following technical parameter in terms of priority, and so on. Also, technical parameters (except for geographic coverage) can be classified based on score calculations) per tranche of intervals to maximise choice and avoid selecting all nodes as dominant nodes.

Examples of Classes

Battery: 3 levels: M (for "Medium"), H (for "High"), L (for "Low")

Social network reputations: 3 levels: M (for "Medium"), H (for "High"), L (for "Low").

The algorithm advantageously takes account of zones of interest.

Terminology

Figure 2B:
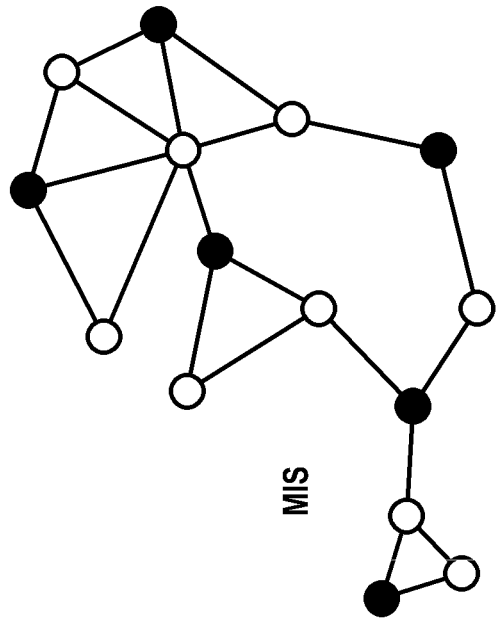
Figure 2A:
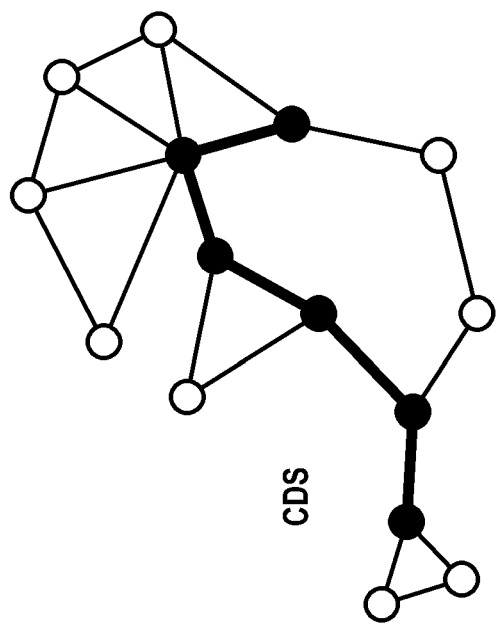
Figure 3B:
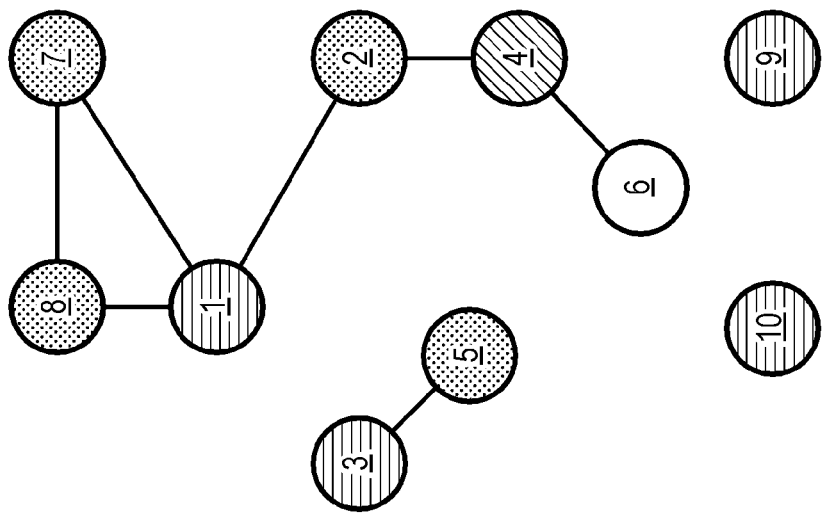
Figure 3A:
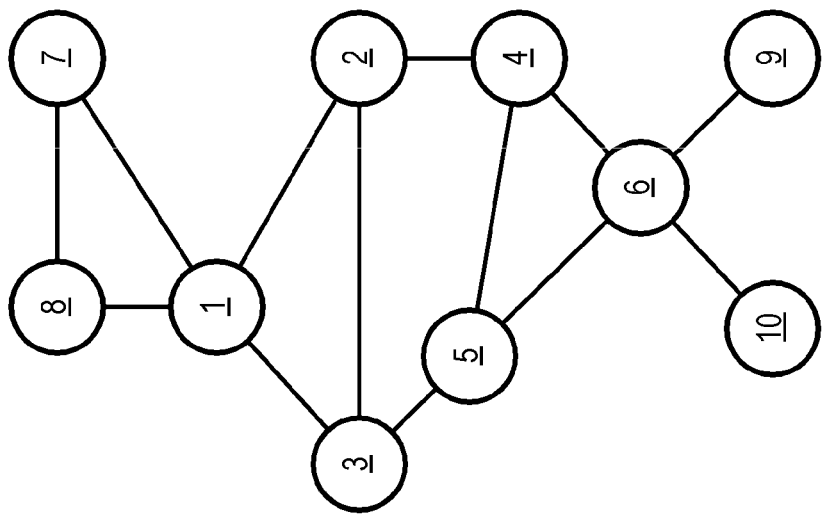

Hereinbelow, the following terminology will be used
CDS or "Connected Dominating Set" according to English terminology: Connected sub-assembly of apices of the graph constituting nodes called dominant, such as all the other nodes of the graph (called non-dominant) have at least one adjacent dominant; FIG. 2a shows this, with the apices constituted by black nodes;
IS or "Independent Set" according to English terminology: an IS is a sub-assembly of nodes which are not adjacent in the graph;
MIS or "Maximum Independent Set" is the IS sub-assembly which has the most nodes. The MIS is used in ad hoc networks for construction of CDS; it is illustrated in FIG. 2b by the black nodes.
Colour Conventions The nodes of the network are associated with colour codes which associate the different nodes with different statuses. By convention,
dominant nodes will be associated with the colour black,
dominated nodes will be associated with the colour white,
nodes associated with intermediate steps will be a so-called grey colour (filling of the node by dots in figures)
MIS nodes ("Maximal Independent Set", that is, the sub-assembly of the nodes of the graph which are not adjacent in the graph and which has the most nodes) will be called a red colour (horizontally hashed nodes in figures),
the algorithm also uses nodes called yellow (vertically hashed nodes in the figures).
Phase 1:

FIG. 3a and the following figures illustrate an initial graph configuration comprising two nodes (referenced from 1 to 10) representing static or low mobility terminals.

By convention, the nodes of a departure graph are all considered as "dominated" (nodes of white colour).

In a first variant embodiment all the nodes having a score which does not respect one of the constraints are eliminated.

Likewise, if the additional constraint of coverage of zones of interest (ZIs) is required, the graph is portioned into sub-graphs according to the nodes belonging to the ZI.

FIG. 3a identifies two zones of interest, one ZI1 formed by the nodes 3 and 5, the other ZI2 formed by the nodes 9 and 10.

As FIG. 3b shows, the result of this is two sub-graphs: one constituted by the two nodes 3 and 5 connected to each other, and one constituted by the nodes which are in neither ZI1 nor in ZI2 and which are also connected to each other (nodes 1, 2, 4 and 6 to 8).

The nodes 9 and 10 per se are independent of each other and do not form any identifiable sub-graph.

For each sub-graph the controller calculates the MIS of the latter as follows:
  it colours the node which has the smallest identifier in red;
  it colours its adjacent nodes one hop away grey and its adjacent nodes two hops away yellow (node 4 in FIG. 3b);
  then, as long as there are yellow nodes remaining:
    it colours the yellow node which has the smallest identifier red;

it colours its adjacent white/yellow nodes one hop away grey and its adjacent white nodes two hops away yellow.

On completion of phase 1 the nodes are coloured red or grey (FIG. 3b. The nodes in red form the MIS.

Phase 2:

In the initial state all the nodes are red or grey.

For each sub-graph, the controller 6 executes the following processing:

a) Calculating for each node the score of each technical parameter as well as the weight of said node; the weight of a node in particular is equal to the sum of the number of its adjacent nodes coloured red (to which it is connected in the graph or sub-graph) and of the number of its adjacent nodes coloured black (to which it is connected in the graph or sub-graph) from which 1 is subtracted; the weight is a composed metric and is based on the values of the technical parameters which are: the 20 degree of connectivity of red nodes and the number of components of the dominant nodes (black nodes).

This metric separates out the nodes when they have the same value of the score.

It is clear that such a weight has been presented in the article by Cheng et al. (2004) which could be referred to advantageously.

b) Eliminating all the nodes with a score which does not respect one of the constraints;

c) Provided there are still grey/red nodes with all scores greater than the requested thresholds:

1) Colouring the node which has the highest score of the highest-priority constraint (overturning the equality by the following scores according to the order then the weight then the identifier) black;

2) Colouring its adjacent non-black nodes white.

Figure 4A:
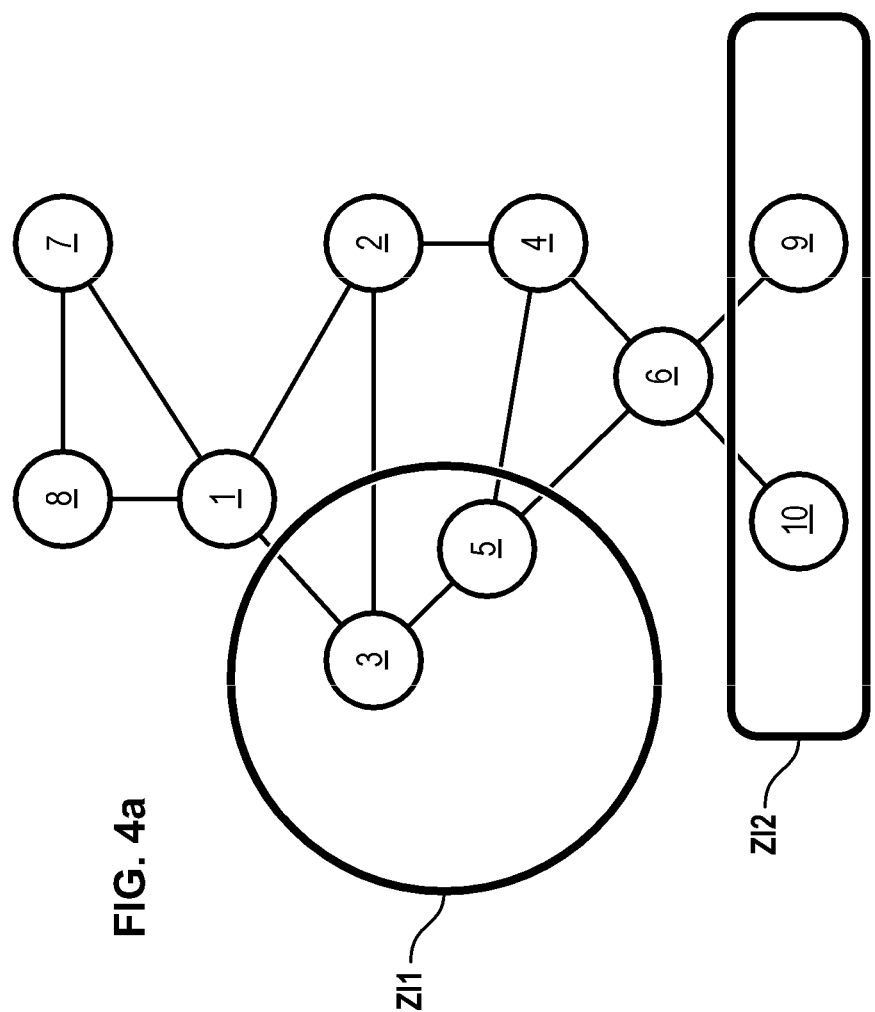
FIGS. 4a to 4d illustrate phase 2 of the same algorithm (calculation of the mDS)

In the example illustrated in FIG. 4a, the aim is to maximise the coverage metric in each sub-graph, the nodes of each ZI having to cover for example over 70% of the zones of interest.

The coverage score is indicated in the figure by the variable S.

The node 3 initially has a score of 80% and a weight of −1 while the node 5 has a score of 40% and a weight of 0.

The node 3 is therefore toggled to black while the node 5 is coloured white.

In the same way, the nodes 9 and 10 initially have the same score S for the coverage constraint (60%) and the same weight P (of value −1). One of the two is selected to toggle to black (the one having the largest identifier).

Likewise, the scores of the nodes of the sub-graph on the right are all equal to 0% (since they are not in the zones of interest), while the weight of nodes 6, 7 and 8 are equal to 0, and those of nodes 1 and 4 are equal to −1. The weight of the node 2 per se is equal to 1. The node 2 is therefore coloured black, the nodes 1 and 4 being coloured white, the nodes 6, 7 and 8 per se remaining grey.

Figure 4B:
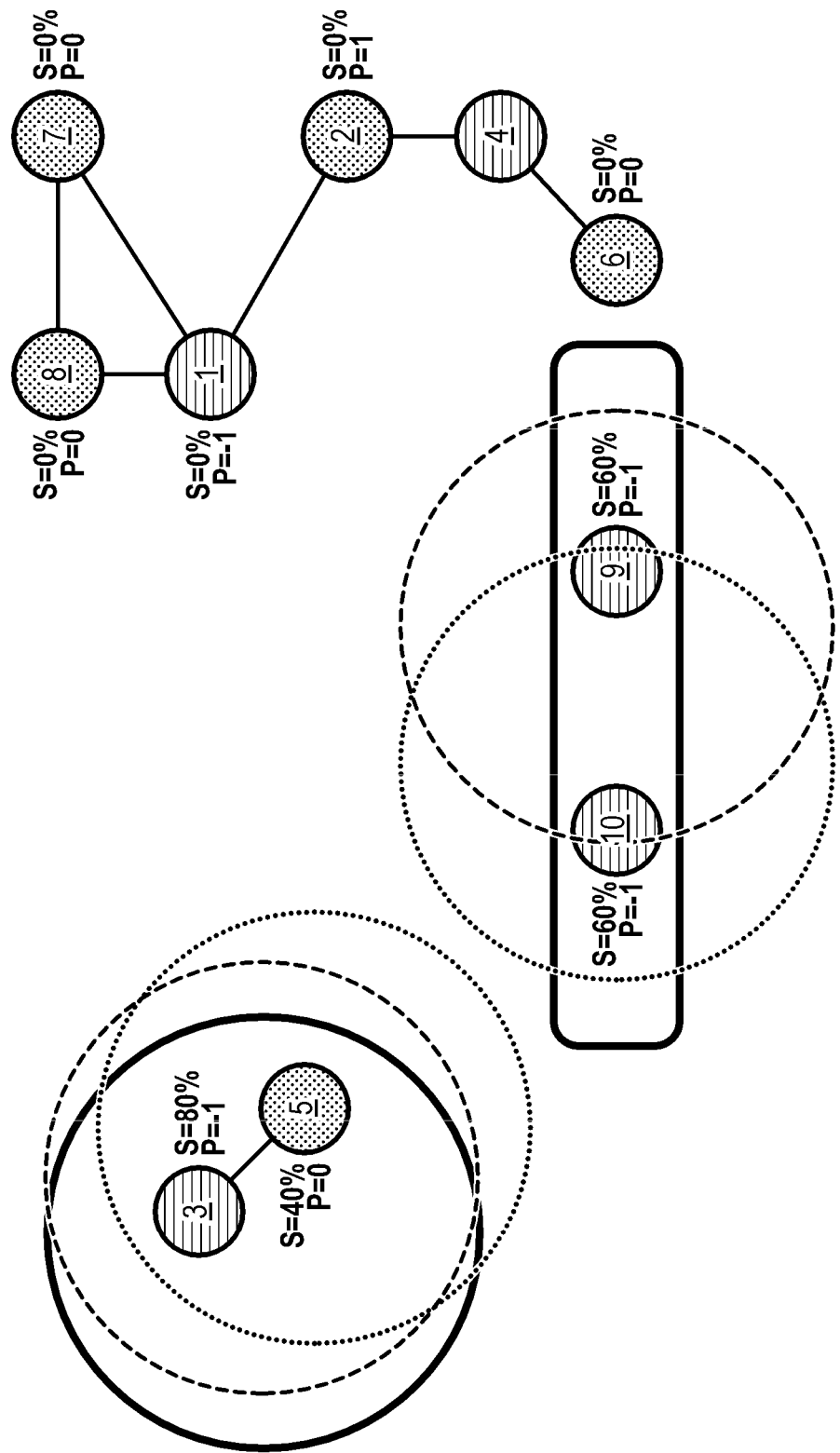

On completion of this first processing, the statuses are those indicated in FIG. 4b.

It should be noted that just 5% of the zone of interest ZI1 could still be covered by the node 5, the rest being either not covered by the nodes 3 or 5 or already covered by the node 3.

The node 5 has a weight equal to 0.

The node 10 per se could still cover 30% more of the zone $ZI_2$. Its weight is equal to −1.

The nodes 6 to 8 have a weight equal to 0, while the nodes 1 and 4 have a weight equal to −1, and the node 2 has a weight equal to 1.

Figure 4C:
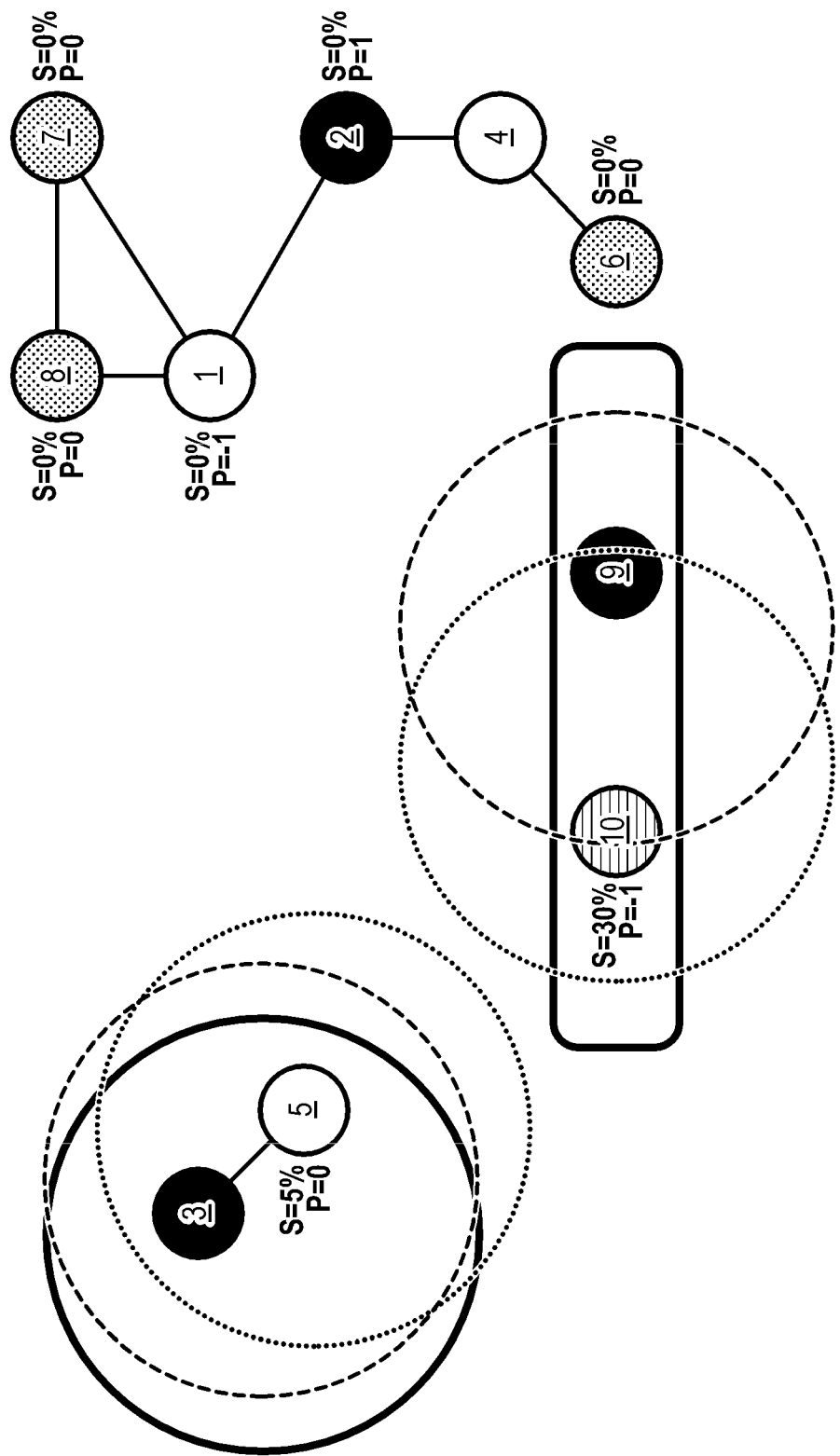
Figure 4D:
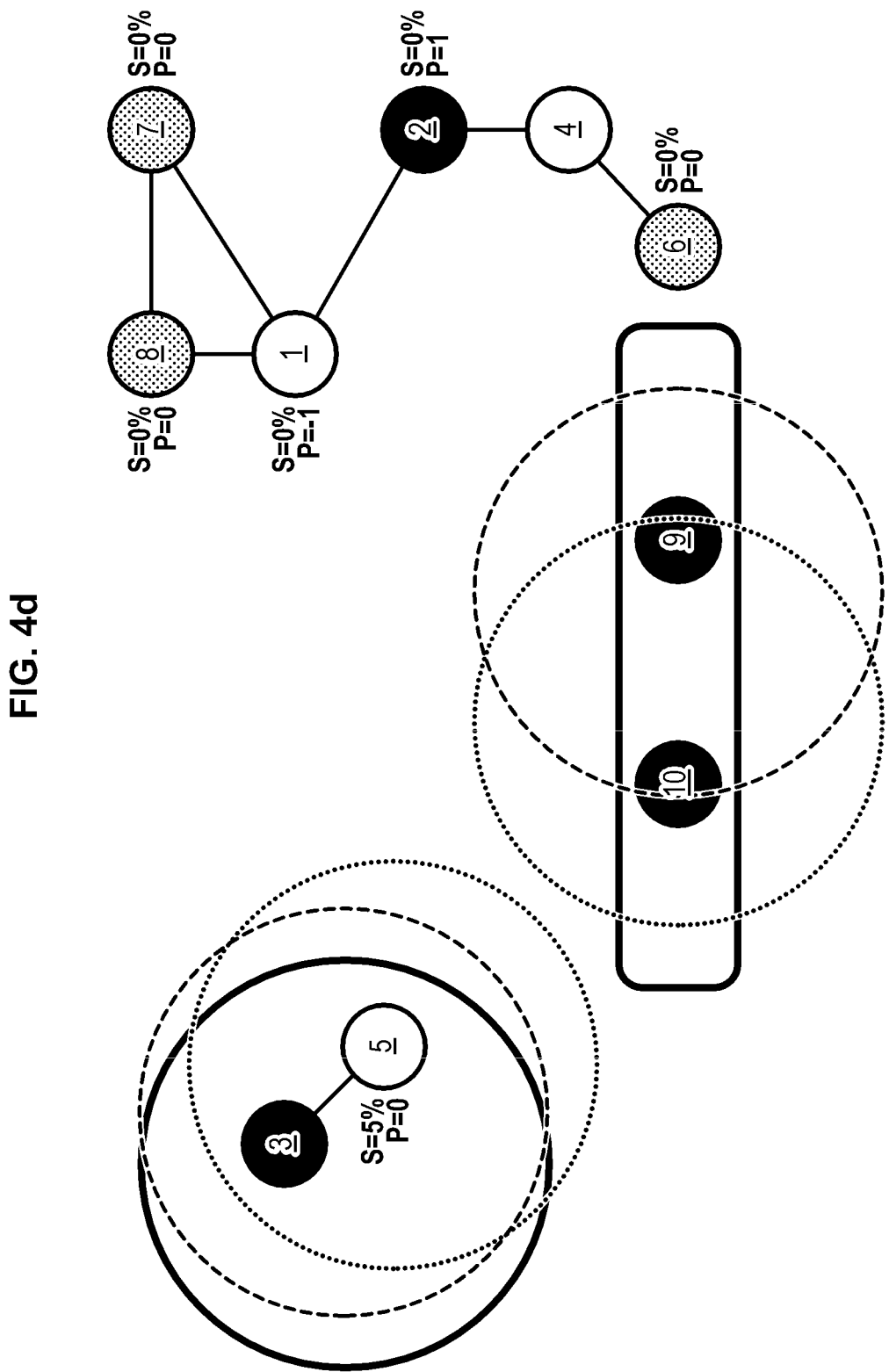

To achieve 70% coverage of the zone $ZI_2$, the node 10 is toggled to a corresponding status to the colour black (dominant node) (FIG. 4c).

The other nodes are unchanged, given that the constraint on the zone $ZI_1$ is already respected and the other nodes do not play a part in respecting the coverage constraint of the zones of interest.

By way of example and non-limiting, a calculation of score can be made by considering the zones of interest as being circular and the radio coverage of the nodes as being circular; overlapping of the circles can be studied accordingly and the dominant nodes deduced.

Reinitialising of the radio coverage of the zones of interest ZI is then carried out to determine other additional dominant nodes if necessary to ensure the threshold of radio coverage for the zone of interest ZI.

Figure 5:
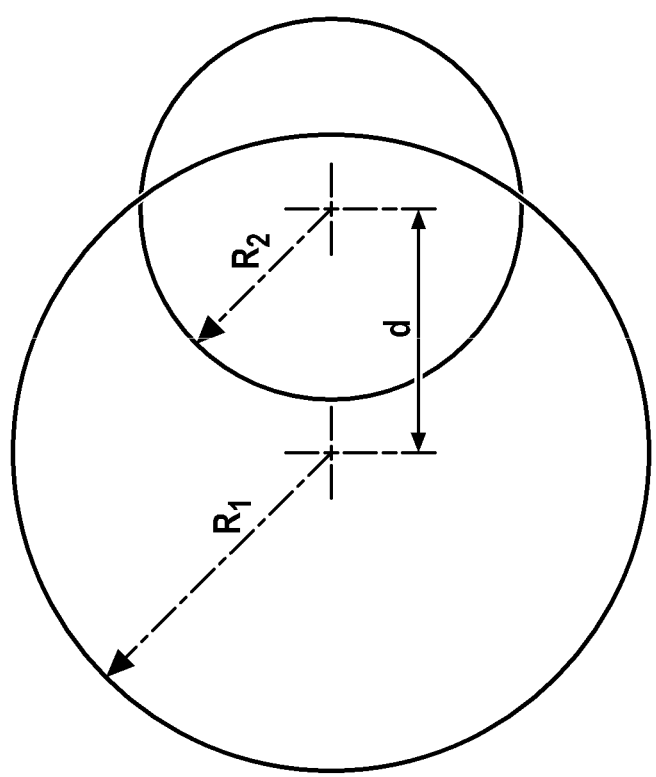
FIG. 5 illustrates an example of calculation of scores for a zone of interest and a radio coverage constraint.

In the example illustrated in FIG. 5, the zone of interest ZI is represented by a circle of radius $R_k$, while the circle C of radius Ri represents the radio coverage about the node i. The distance between the centres of the two circles is referenced by d. The area of the asymmetric intersection lens between the two circles is given by $$\text{Area}(i, k) = R_k^2 \sin^{-1}\left(\frac{a}{2R_k}\right) - \sqrt{s_k(s_k - a)(s_k - R_k)^2} + \quad (1)$$
$$R_i^2 \sin^{-1}\left(\frac{a}{2R_i}\right) - \sqrt{s_i(s_i - a)(s_i - R_i)^2},$$

with $$a = \frac{1}{d}\sqrt{(-d + R_k + R_i)(d - R_k + R_i)(d + R_k - R_i)} \times \sqrt{(d + R_k + R_i)}$$

$$s_k = \frac{a + 2R_k}{2}$$

$$s_i = \frac{a + 2R_i}{2}$$

The score $score_i^k$ assigned to the node i in the zone of interest ZI is given by the following formula:

$$score_i^k = \frac{\text{Area}(i, k)}{\text{Area}(k)}. \quad (2)$$

When anode i having the highest score in the zone of interest ZI k is selected as dominant, the scores of all the non-dominant nodes j in the same zone of interest are updated per common overlap zone of three circles (i,j,k). More particularly, for anon-dominant node j in the zone of interest ZI k, its updated score is given according to the following formula:

$$score_j^k = score_j^k - \frac{\text{Area}(i, j, k)}{\text{Area}(k)}. \quad (3)$$

Phase 3.a:

On completion of the processing of phase 2, the controller 6 resends the previous sub-graphs in a single graph.

For any grey/red node which becomes adjacent to a black node, it colours this node white.

Figure 6B:
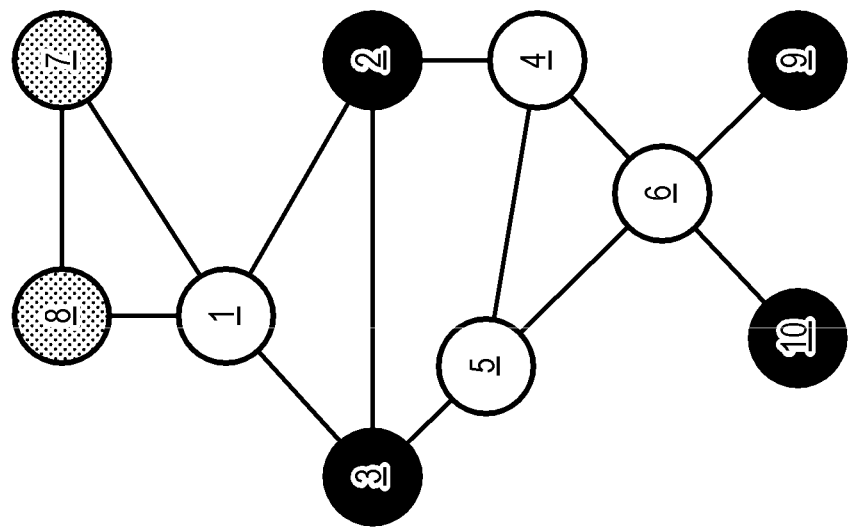
Figure 6A:
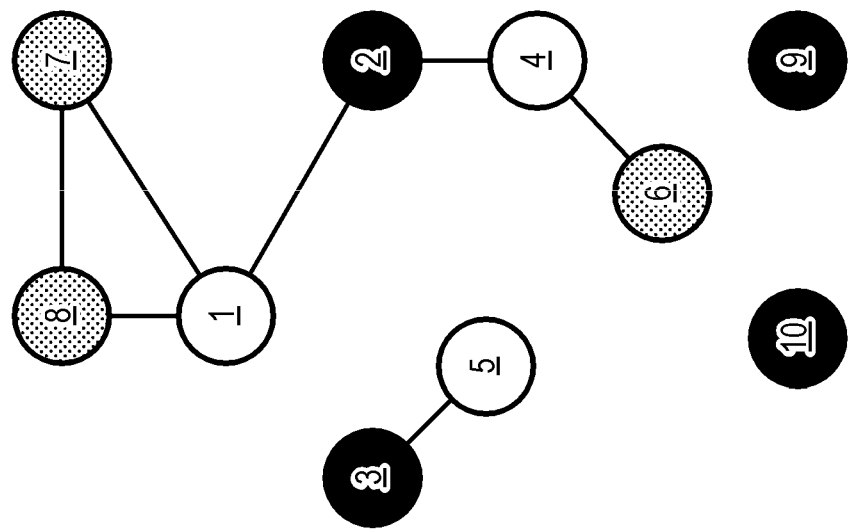

In the example illustrated in FIGS. 6a and 6b, the node 6 becomes white (status of dominated node).

Phase 3.b:

In this phase, the controller 6 creates the sub-graphs with the remaining grey nodes.

Figure 7A:
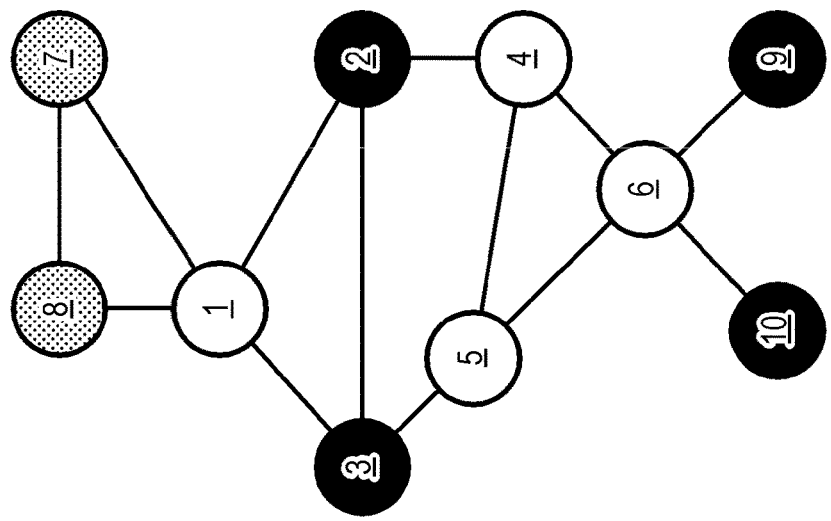
Figure 7B:
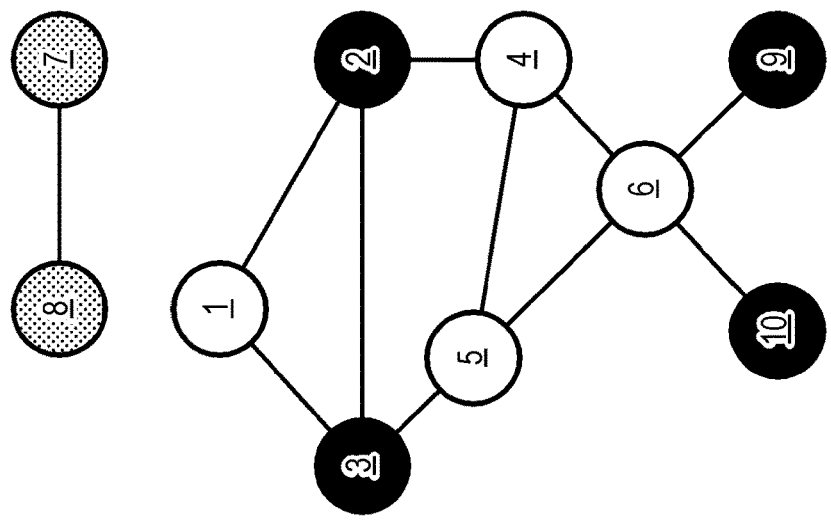
Figure 7C:
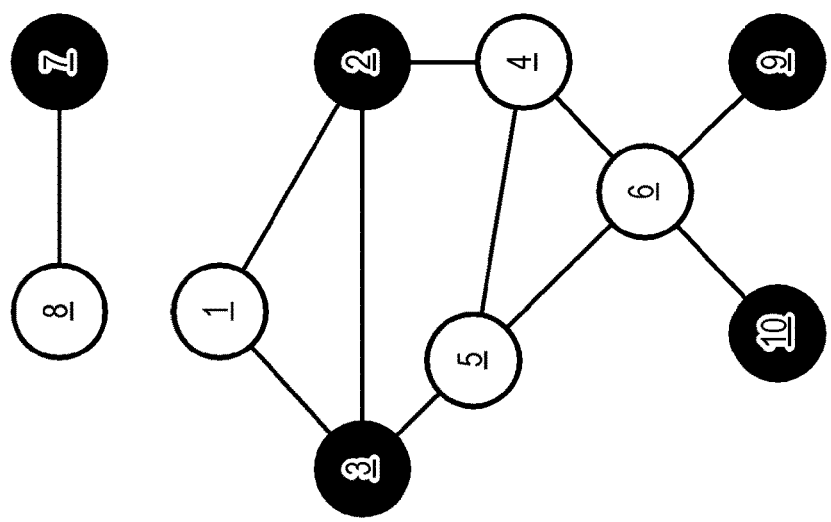

This is what is illustrated by FIGS. 7a to 7c in which the nodes 7 and 8 are isolated in a new sub-graph.

If needed, it colours the adjacent red/white node of one of the remaining grey nodes and the closest of a black component black; it also colours its adjacent nodes white.

Next, for each sub-graph it performs the following steps:
a) Colouring the grey node which has the most adjacent grey nodes black;
b) Colouring its adjacent nodes white;
c) Provided there are still grey nodes:
1) Colouring the white node which has the most adjacent grey nodes black;
2) Colouring its adjacent nodes white.

In FIG. 7c the node 7 having the shortest identifier is toggled to dominant status and coloured black, while the node 8 is toggled to dominated status and coloured white.

As a variant, the processing of steps (a), (b), (c) can be carried out directly on the departure graph. This is illustrated in FIGS. 8a and 8b in which the node 1 which comprises the two grey adjacent nodes 7 and 8 is toggled to the dominant status (coloured black), while the nodes 7 and 8 take on the dominated status (coloured white).

Phase 3.c:

During this phase, the controller 6 performs the following steps:
a) Restoring the entire graph;
b) For each remaining red node:
1) Colouring this node black if it has an adjacent black node after step 3.b.

Phase 4:

Provided there are still white nodes remaining:
a) Colouring one to two white nodes (minimum thee possible), provided they do not respect the constraints, black to connect black components.

This is illustrated in FIGS. 9a, 9b and 10a, 10b for which the node 1 and the nodes 4 and 6 are toggled to the dominant status (coloured black).

On completion of processing, the result is a core network of dominant nodes which are then used as backbone for the virtual multi-hop proximity communication network with dynamic architecture.

Figure 11:
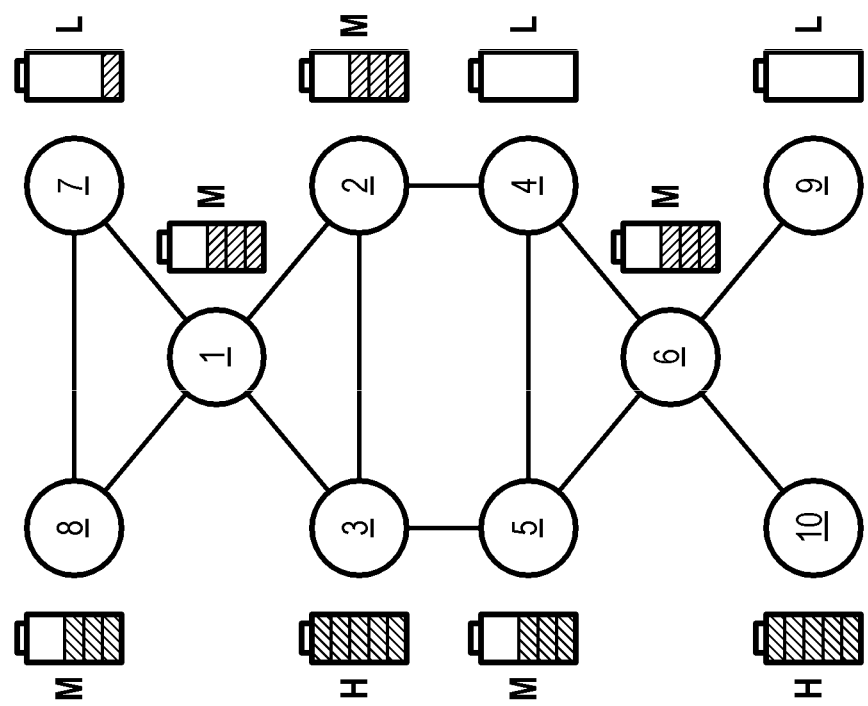
Figure 12:
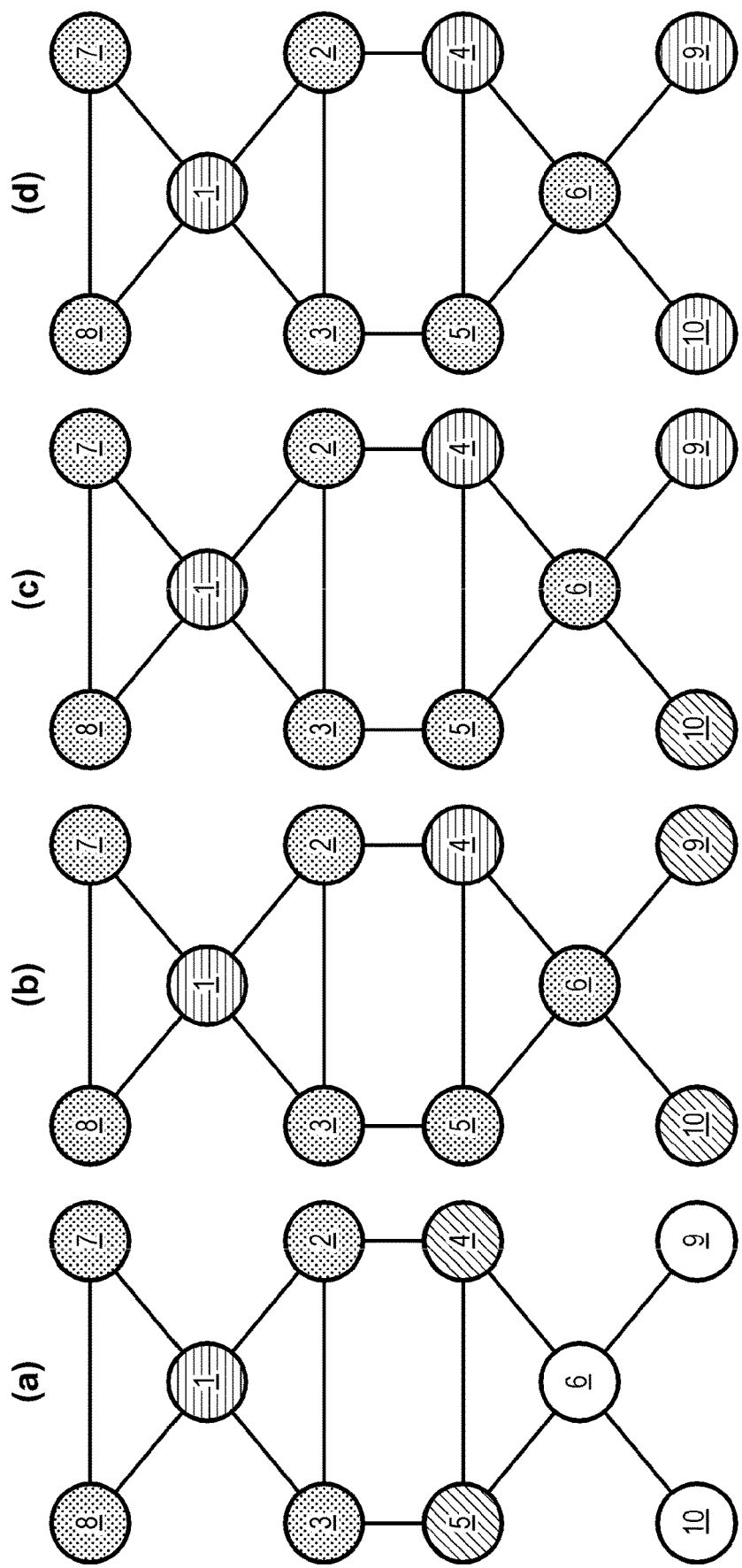
Figure 13:
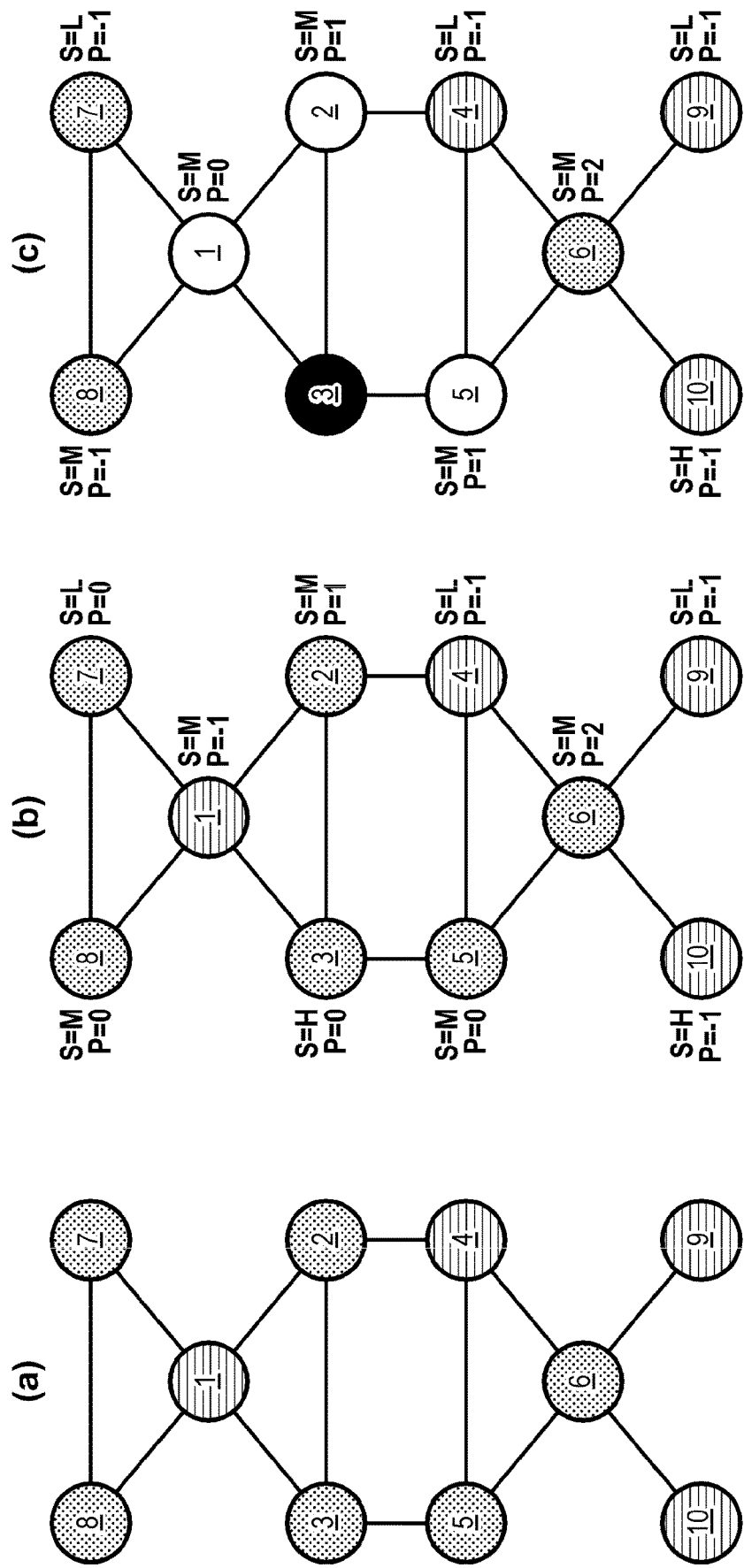
Figure 13:
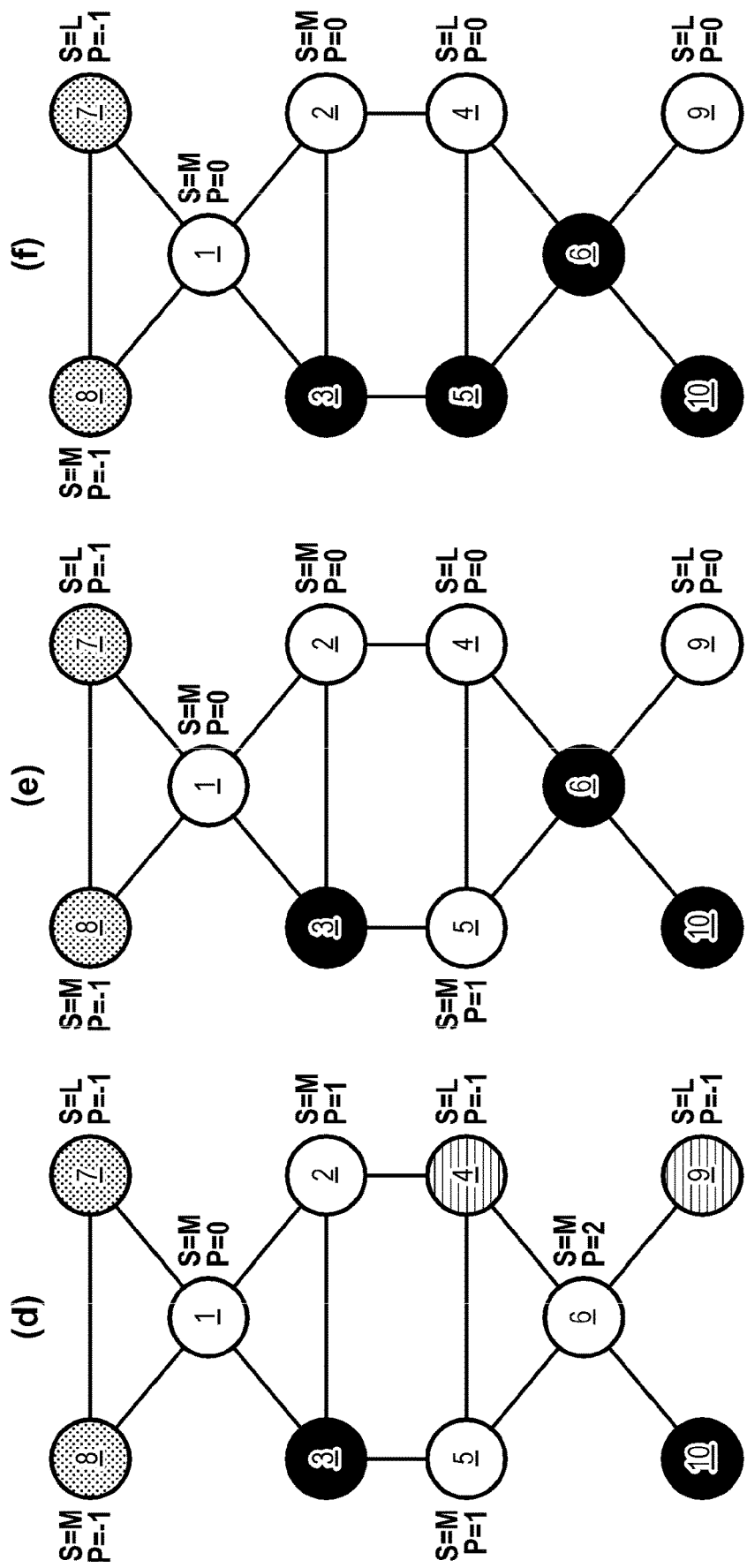
Figure 13:
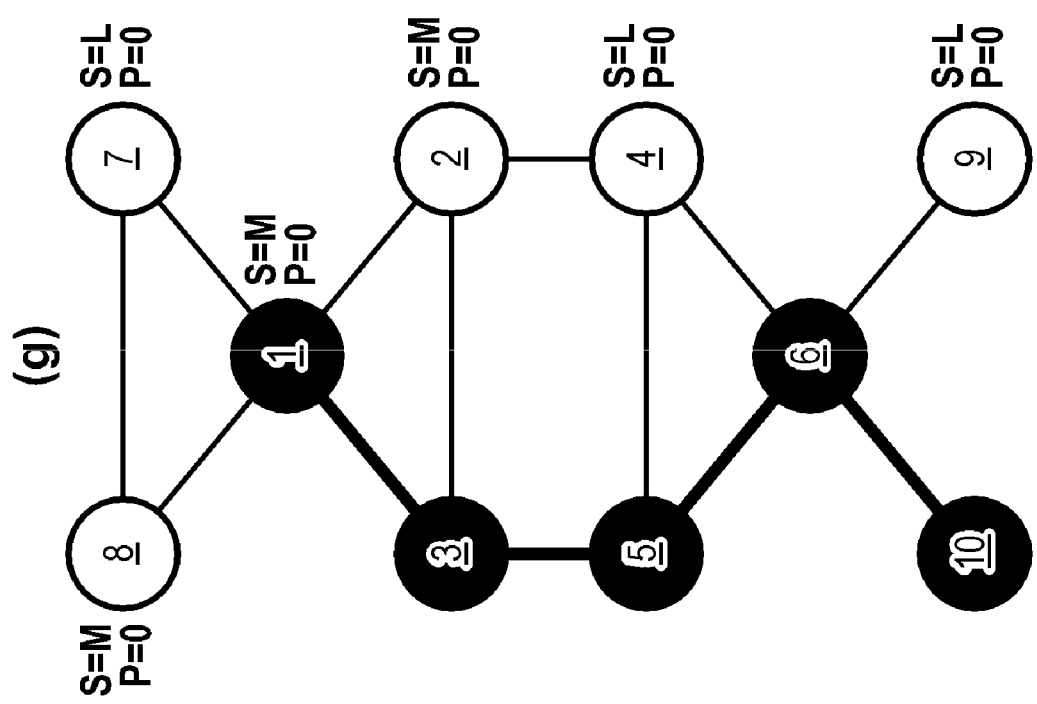

Another example is illustrated in FIG. 11 with the case of a constraint on the level of battery charging.

In the example illustrated the graph comprises 10 nodes which are either at a low charge level (nodes 4, 7 and 9 at level L) or at a median charge level (nodes 1, 2, 5, 6, 8), or at a high charge level (nodes 3 and 10 at level H).

The constraint is to form a network with the battery charge levels higher than the median level M. FIGS. 12a to 12d show the different steps for formation of the MIS. The nodes 1, 4, 9 and 10 are toggled to red on completion of this first phase, while the other nodes are grey.

In a second phase (FIGS. 13a to 13g), the controller 6 calculates the mDS from battery levels and weight of nodes. The result is the mDS structure illustrated in FIG. 13g.

Given that on completion of this phase no node is in grey status, phases 3 and 4 do not have to be executed.

The black nodes constitute a network of dominant nodes which are then used as backbone for the virtual multi-hop proximity communication network with dynamic architecture.

Of course, several constraints could be associated for determining the Fog network, for example coverage at over 70% of each zone of interest and a level of battery charge for each node higher than median level, or more generally any other constraint which could be considered useful.

To execute the process described above, constraints can be hierarchised per zones of interest.

FIGS. 14a, 14b and 14c give results for dimensions of Fog networks obtained as a function of the number of departure nodes (FIG. 14a), as a function of the dimensions of zones of interest to be covered (FIG. 14b) or again as a function of the number of zones of interest to be covered (FIG. 14c).

The results obtained in the case of the proposed process (curves B) and in the case of the Cheng algorithm (curves C) are similar if there is interest only in the number of departure nodes (FIG. 14a); the proposed process however enables a time gain in terms of nodes used to constitute the network CDS due to the variants in step 3b illustrated in FIGS. 8a and 8b and that of phase 1 in which all nodes having a score which does not respect one of the constraints are eliminated.

This gain is all the more surprising since the fact of considering more technical parameters than Cheng would result a priori in constituting more nodes for the network, but which is more than compensated by the variants proposed by the inventors.

This gain is all the greater since it is taken from zones of interest of considerable dimensions (FIG. 14b) or numerous dimensions (FIG. 14c).

The invention claimed is:

1. A communication process between terminals including one or more groups of two terminals,
wherein each group of two terminals of the terminals is adapted to execute wireless communications between respective two terminals of the group, via a first communication link, the first communication link is a wireless communication link, when a distance separating the two terminals is less than a maximum distance,
wherein each terminal of the terminals is configured to communicate via a second communication link, the second communication link is a cellular communication link, with a server of remote resources, wherein the server of remote resources is a control server accessible over a network of Cloud Computing type in which computing power and storage are managed by remote servers to which users connect via a communication link,
the communication process comprising the following steps:
each terminal transmits to the server of remote resources control information and technical information, the control information comprising information for identifying and positioning the terminal, and wherein the technical information is relative to a technical parameter,
and based on the control information received, the server of remote resources:
determines one or more user terminals among the terminals, wherein each user terminal is static or having a relative speed with another user terminal less than the maximum speed, wherein the user terminals jointly form nodes of a multi-hop proximity communication network with dynamic architecture, each user terminal exchanging with other user terminals of the user terminals in the multi-hop proximity communication network via the first wireless communication link, the server of remote resources supervising the dynamic architecture of the multi-hop proximity network,
determines among the terminals, one or more end-user terminals, wherein each end-user terminal is different from any user terminal, determines a graph of the nodes of the multi-hop proximity communication network, wherein two nodes of the graph are connected by a bridge if a distance between the two nodes is less than the maximum distance, determines, in the graph, a sub-graph of dominant nodes, the determination of the sub-graph being optimised so as to minimise a number of dominant nodes and with respect to a constraint on the technical parameter, selects among the dominant nodes a gateway node, the gateway node being suitable for setting up a communication with the network of Cloud Computing type via the second cellular communication link, determines nodes of the graph different from the dominant nodes as relay nodes, the relay nodes having a function of access, relay, or both access and relay to the multi-hop proximity network for the one or more end-user terminals, transmits individually to each of the one or more user terminals a hierarchical status via the second cellular communication link, the hierarchical status of the one or more user terminals based on the information that the user terminal is a gateway node, a dominant node or a relay node during a period, the period depending on an ongoing configuration of the one or more user terminals.

2. The process according to claim 1 wherein, once the server of remote resources transmits the hierarchical status, when a first user terminal of the one or more user terminals emits a request, the first user terminal emits the request:

wherein the first user terminal transmits the request firstly, to the multi-hop proximity communication network, via the first communication link, the dominant nodes configured for managing the request and for providing a response to the first user terminal emitting the request, and if the first user terminal does not receive a satisfactory response provided by the dominant nodes, then the first user terminal transmits the request to the server of remote resources either directly via the second communication link, or via a gateway node in communication with the server of remote resources via the second communication link.

3. The process according to claim 1, wherein the server of remote resources subdivides the graph into one or more geographic zones of interest, wherein one or more technical parameters is defined for each geographic zone of the one or more geographic zones of interest, the multi-hop proximity communication network having user terminals in the one or more geographic zones of interest.

4. The process according to claim 3, wherein the server of remote resources processes the one or more technical parameters and defines an order of priority of the technical parameters based on the one or more technical parameters, and wherein the server of remote resources defines an order of priority in each geographic zone of interest.

5. The process according to claim 1, wherein the server of remote resources processes one or more technical parameters and defines an order of priority of the technical parameters.

6. The process according to claim 1, wherein the technical parameter transmitted by a terminal is selected from the following list:

a degree of connectivity of the terminal with the other terminals;
a radio coverage;
a quality of connection;
a memory capacity for data storage;
an available battery power level;
a speed of the terminal;
a quality of the connection of the terminal to the multi-hop proximity network; and
an e-reputation or other information of an owner of the terminal related to social networks.

7. The process according to claim 1, wherein the constraint on the technical parameter is defined by:

a threshold, when the technical parameter is the radio coverage; or
two to four classes of intervals for the technical parameter, when the technical parameter is the memory capacity for data storage or the available battery power level.

8. The process according to claim 7, wherein the constraint on the technical parameter is defined by a threshold of radio coverage in a geographic zone of interest and wherein two technical parameters are used: degree of connectivity and radio coverage, the radio coverage having an order of priority below an order of priority of the degree of connectivity;

an overlapping of the radio coverage of nodes with the geographic zone of interest is calculated, nodes having the largest radio coverage in the geographic zone of interest are defined as retained nodes, the retained nodes are dominant nodes, and a surface of the zones of interest to be covered outside radio coverages of the determined dominant nodes is reinitialized, to determine other dominant nodes if necessary to cover the zone of interest.

9. The process according to claim 1, wherein data is hosted in the dominant nodes of the multi-hop proximity communication network and originates from the network of Cloud Computing type, the server of remote resources and/or the terminals, the dominant nodes being configured to communicate and share the data between the dominant nodes.

10. The process according to claim 1, wherein a first external range of communications for the first communication link is less than 300 meters, and wherein a second external range of communications for the second communication link is over 400 meters.

11. The process according to claim 1, wherein the terminals are configured to communicate using one or more of WiFi, Bluetooth, Zigbee, V2X, C-V2X, and DSRC communication interfaces for the first link communication, and using one or more of 2G, 3G, 4G, LTE, and 5G communication interfaces for the second communication link, the server of remote resources being compliant with the SDN model, each terminal having a corresponding control unit.

12. The process according to claim 1, wherein, when the server of remote resources detects an arrival, a departure, or an arrival and a departure of user terminals, the server of remote resources restarts determining hierarchal statuses of the nodes.

13. The process according to claim 1, wherein for determining the sub-graph which comprises a geographic zone or geographic zones of interest, the server of remote resources performs the following in succession:

in a first step, forming a Maximum Independent Set in the graph, and independently in the geographic zone or geographic zones of interests of the sub-graph if the graph comprises one or more geographic zones of interests;

in a second step, forming a Minimum Dominating Set, comprising:
  (i) calculating scores of the technical parameter or technical parameters for each node of the graph to obtain first dominant nodes,
  the scores satisfying the constraint on the technical parameter or the technical parameters for dominant nodes,
  (ii) updating the scores of the technical parameter or technical parameters,
  (iii) determining other second dominant nodes in addition to the first dominant nodes, by restarting phase (i) and phase (ii) until the constraint is not satisfied for the remaining nodes;
in a third step, updating remaining nodes into dominated nodes on the entire graph for which all the zones of interest have been combined; and updating the scores of the technical parameter or technical parameters, and determining other dominant nodes from the dominated nodes;
in a fourth step, connecting each dominant node with the other dominant nodes so as to form a Minimum Connected Dominating Set.

14. The process according to claim 13, wherein in the first step the server of remote resources previously eliminates nodes which do not respect a preferred class of interval for the technical given constraint on the given technical parameter.

15. The process according to claim 14, wherein the server of remote resources transforms dominated nodes into dominant nodes in the third phase after combining all the zones of interest to form the entire graph.

16. An assembly comprising terminals, including one or more groups of two terminals,
  wherein each group of two terminals of the terminals is adapted to execute wireless communications between respective two terminals of the group, via a first communication link, the first communication link being a wireless communication link, when a distance separating the two terminals is less than a maximum distance,
  wherein each terminal of the terminals is adapted to communicate, via a second communication link, the second communication link is a cellular communication link, with a server of remote resources, the server of remote resources being a control server accessible over a network of Cloud Computing type in which computing power and storage are managed by remote servers to which users connect via a communication link, the terminals comprising one or more user terminals, wherein each user terminal is static or having a relative speed with another user terminal inferior to a maximum speed, wherein the user terminals jointly form nodes of a multi-hop proximity communication network with dynamic architecture,
  the other terminals that are not the one or more user terminals being end-user terminals, the end-user terminals communicating to the server of remote resources a control information via a second cellular communication link, and the end-user terminals communicating to the multi-hop proximity communication network via the first wireless communication link,
  the one or more user terminals comprising one or more dominant nodes, one or more relay nodes, and one or more gateway nodes, and the one or more user terminals being configured to:
    dominant nodes respond to requests of end-user terminals and host data which originate from the network of Cloud Computing type, the server of remote resources and/or terminals,
  wherein the one or more gateway nodes are configured to communicate, via the first wireless communication link, the second cellular communication link, or both the first wireless communication link and the second cellular communication link, with the server of remote resources;
  wherein the one or more relay nodes are configured to access, relay, or access and relay to the multi-hop proximity network for the end-user terminals.

* * * * *